US012718236B2

(12) United States Patent
Singh et al.

(10) Patent No.: US 12,718,236 B2
(45) Date of Patent: Aug. 25, 2026

(54) METHODS AND SYSTEMS FOR ENABLING INTEROPERABILITY BETWEEN DIFFERENT FAST IDENTITY ONLINE (FIDO) SERVICE PROVIDERS

(71) Applicant: MASTERCARD INTERNATIONAL INCORPORATED, Purchase, NY (US)

(72) Inventors: Sachin Kumar Singh, Pune (IN); Kaushal Shetty, O'Fallon, MO (US); Mayank Joshi, Pune (IN); Venkata Satya Sivajee Pinnamaneni, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/829,220

(22) Filed: Sep. 9, 2024

(65) Prior Publication Data

US 2026/0073387 A1 Mar. 12, 2026

(51) Int. Cl.
*G06Q 20/40* (2012.01)

(52) U.S. Cl.
CPC .................................... *G06Q 20/40* (2013.01)

(58) Field of Classification Search
None
See application file for complete search history.

(56) References Cited

U.S. PATENT DOCUMENTS 10,091,195 B2 10/2018 Lindemann
10,917,405 B2 * 2/2021 Nowak ............... H04L 63/0869
(Continued)

FOREIGN PATENT DOCUMENTS

CN 115189885 A 10/2022
JP 2023159773 A1 11/2023
(Continued)

OTHER PUBLICATIONS

Unknown, "FIDO2 WebAuthn API endpoints", SecureAuth, copyright Jul. 16, 2020, https://docs.secureauth.com/2307/en/fido2-webauthn-api-endpoints.html#:~:text=The%20%2Ffido%2Ftokens%2F%3C,in%20the%20URL. https://patents.google.com/patent/US20220318901A1/en, 4 pages.
(Continued)

*Primary Examiner* — Christopher Bridges
(74) *Attorney, Agent, or Firm* — Barta Jones, PLLC

(57) ABSTRACT

Embodiments provide methods and systems for enabling interoperability between different Fast Identity Online (FIDO) service providers. A method performed by the server system includes receiving a mismatch resolution request including authentication information from a payment gateway for a FIDO authentication of a user. The method includes extracting a template associated with the second FIDO service provider from a plurality of templates. The method includes mapping, by a rule-based model, the authentication information on the template and transmitting a FIDO authentication request message including the template to the second FIDO service provider. Upon receiving a FIDO authentication response message including an authentication successful flag from the second FIDO service provider, the method includes transmitting an authentication successful message to the payment gateway.

18 Claims, 8 Drawing Sheets

(56) References Cited

U.S. PATENT DOCUMENTS

| | | | | |
|---|---|---|---|---|
| 11,494,768 | B2 | 11/2022 | Abouelenin | |
| 2018/0167383 | A1* | 6/2018 | Mandyam | H04L 63/08 |
| 2020/0280550 | A1 | 9/2020 | Lindemann et al. | |
| 2021/0182373 | A1 | 6/2021 | Tussy | |
| 2023/0091318 | A1 | 3/2023 | Lindemann | |

FOREIGN PATENT DOCUMENTS

| | | | | |
|---|---|---|---|---|
| KR | 101924683 | B1 | 12/2018 | |
| WO | WO-2025023533 | A1 * | 1/2025 | H04W 4/80 |

OTHER PUBLICATIONS

Takakuwa et al., "The Transfer Access Protocol—Moving to New Authenticators in the FIDO Ecosystem", Technical Report UW-CSE-17-06-01, https://dada.cs.washington.edu/research/tr/2017/06/UW-CSE-17-06-01.pdf, 16 pages.

* cited by examiner

Figure 6:
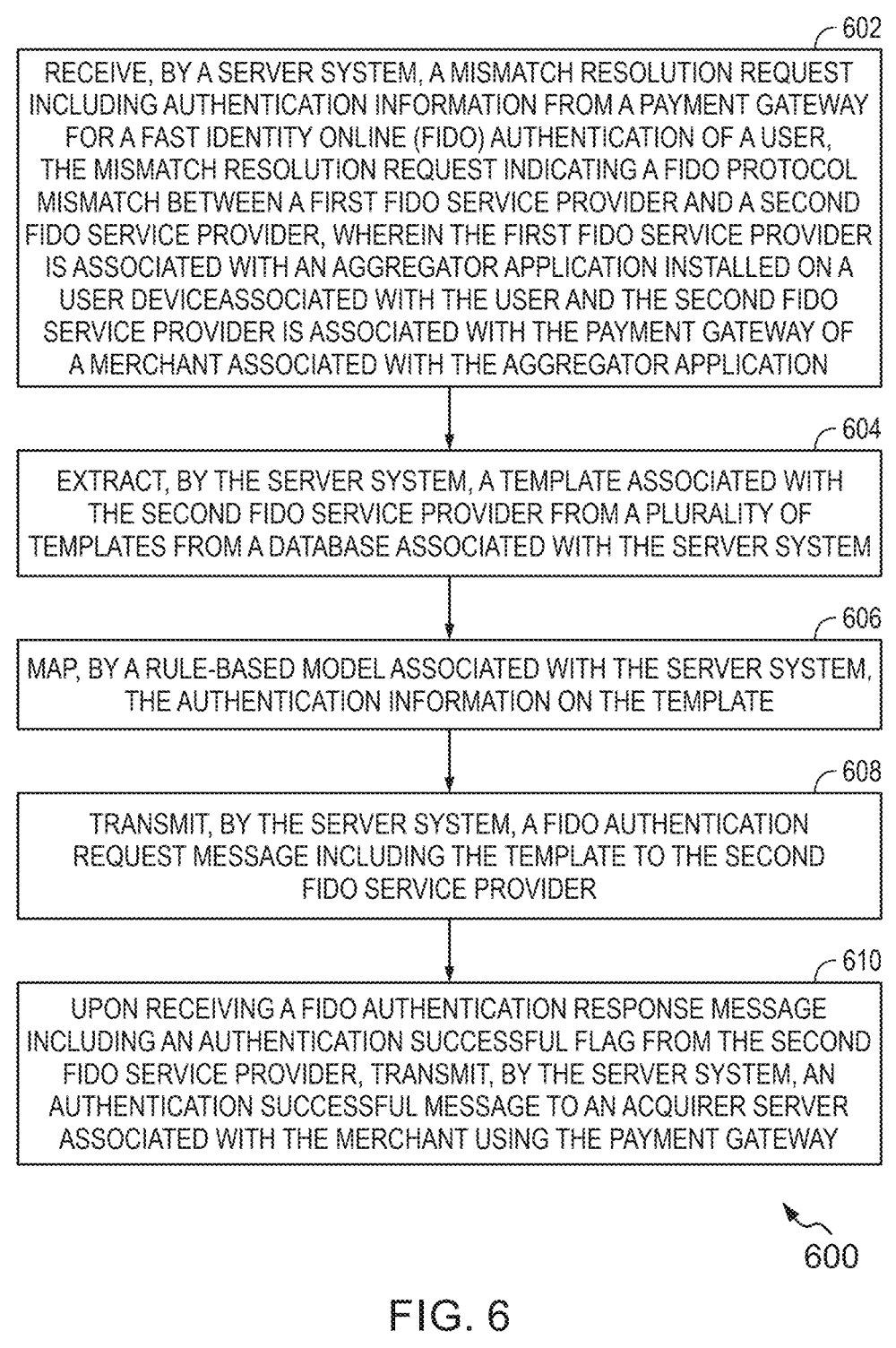

602
RECEIVE, BY A SERVER SYSTEM, A MISMATCH RESOLUTION REQUEST INCLUDING AUTHENTICATION INFORMATION FROM A PAYMENT GATEWAY FOR A FAST IDENTITY ONLINE (FIDO) AUTHENTICATION OF A USER, THE MISMATCH RESOLUTION REQUEST INDICATING A FIDO PROTOCOL MISMATCH BETWEEN A FIRST FIDO SERVICE PROVIDER AND A SECOND FIDO SERVICE PROVIDER, WHEREIN THE FIRST FIDO SERVICE PROVIDER IS ASSOCIATED WITH AN AGGREGATOR APPLICATION INSTALLED ON A USER DEVICEASSOCIATED WITH THE USER AND THE SECOND FIDO SERVICE PROVIDER IS ASSOCIATED WITH THE PAYMENT GATEWAY OF A MERCHANT ASSOCIATED WITH THE AGGREGATOR APPLICATION

604
EXTRACT, BY THE SERVER SYSTEM, A TEMPLATE ASSOCIATED WITH THE SECOND FIDO SERVICE PROVIDER FROM A PLURALITY OF TEMPLATES FROM A DATABASE ASSOCIATED WITH THE SERVER SYSTEM

606
MAP, BY A RULE-BASED MODEL ASSOCIATED WITH THE SERVER SYSTEM, THE AUTHENTICATION INFORMATION ON THE TEMPLATE

608
TRANSMIT, BY THE SERVER SYSTEM, A FIDO AUTHENTICATION REQUEST MESSAGE INCLUDING THE TEMPLATE TO THE SECOND FIDO SERVICE PROVIDER

610
UPON RECEIVING A FIDO AUTHENTICATION RESPONSE MESSAGE INCLUDING AN AUTHENTICATION SUCCESSFUL FLAG FROM THE SECOND FIDO SERVICE PROVIDER, TRANSMIT, BY THE SERVER SYSTEM, AN AUTHENTICATION SUCCESSFUL MESSAGE TO AN ACQUIRER SERVER ASSOCIATED WITH THE MERCHANT USING THE PAYMENT GATEWAY

Figure 7:
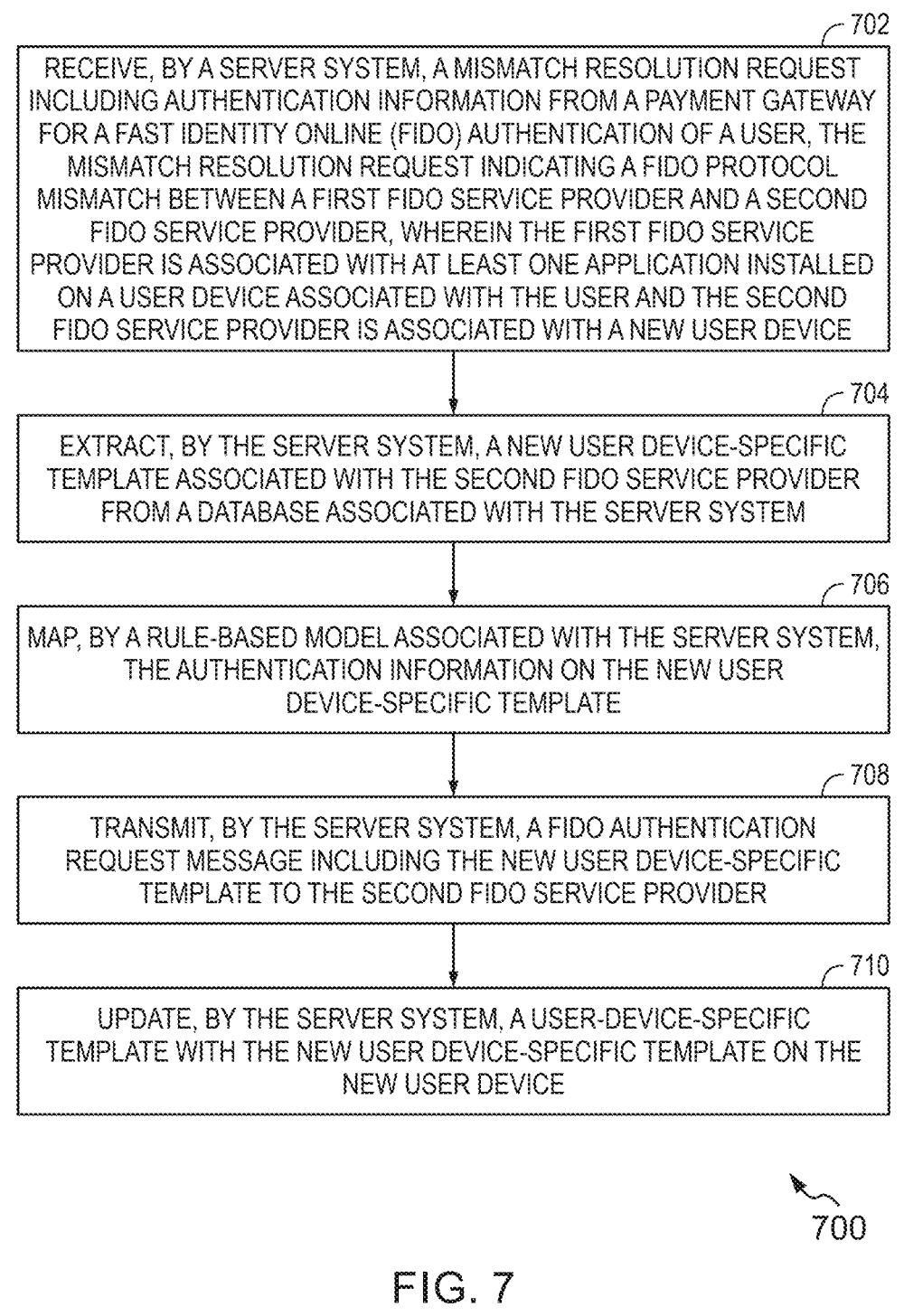

702
RECEIVE, BY A SERVER SYSTEM, A MISMATCH RESOLUTION REQUEST INCLUDING AUTHENTICATION INFORMATION FROM A PAYMENT GATEWAY FOR A FAST IDENTITY ONLINE (FIDO) AUTHENTICATION OF A USER, THE MISMATCH RESOLUTION REQUEST INDICATING A FIDO PROTOCOL MISMATCH BETWEEN A FIRST FIDO SERVICE PROVIDER AND A SECOND FIDO SERVICE PROVIDER, WHEREIN THE FIRST FIDO SERVICE PROVIDER IS ASSOCIATED WITH AT LEAST ONE APPLICATION INSTALLED ON A USER DEVICE ASSOCIATED WITH THE USER AND THE SECOND FIDO SERVICE PROVIDER IS ASSOCIATED WITH A NEW USER DEVICE

704
EXTRACT, BY THE SERVER SYSTEM, A NEW USER DEVICE-SPECIFIC TEMPLATE ASSOCIATED WITH THE SECOND FIDO SERVICE PROVIDER FROM A DATABASE ASSOCIATED WITH THE SERVER SYSTEM

706
MAP, BY A RULE-BASED MODEL ASSOCIATED WITH THE SERVER SYSTEM, THE AUTHENTICATION INFORMATION ON THE NEW USER DEVICE-SPECIFIC TEMPLATE

708
TRANSMIT, BY THE SERVER SYSTEM, A FIDO AUTHENTICATION REQUEST MESSAGE INCLUDING THE NEW USER DEVICE-SPECIFIC TEMPLATE TO THE SECOND FIDO SERVICE PROVIDER

710
UPDATE, BY THE SERVER SYSTEM, A USER-DEVICE-SPECIFIC TEMPLATE WITH THE NEW USER DEVICE-SPECIFIC TEMPLATE ON THE NEW USER DEVICE

METHODS AND SYSTEMS FOR ENABLING INTEROPERABILITY BETWEEN DIFFERENT FAST IDENTITY ONLINE (FIDO) SERVICE PROVIDERS

TECHNICAL FIELD

The present disclosure relates to methods and systems for authenticating a payment transaction using Fast Identity Online (FIDO) technology and, more particularly to, electronic methods and systems for enabling interoperability between different FIDO services.

BACKGROUND

Nowadays, in the payment ecosystem, digital payments have become a prominent player in the transactions between users and merchants. Digital payments must be quick and convenient for the users while being secure as well. For ensuring both convenient and secure user authentication, Fast Identity Online (FIDO) transactions have been widely adopted by various merchants. In FIDO transactions, the user authentication is enhanced by replacing password-based authentication with strong cryptographic methods. In the FIDO authentication process, the user has to register with a FIDO authenticator provided by a FIDO service provider. When the user registers with the FIDO authenticator using a FIDO-enabled device, a unique key pair including a private and public key is generated. The private key remains on the user's device, while the public key is registered with the FIDO service provider. During authentication, the FIDO service provider sends a challenge to the user's device, which signs it with the private key, thereby proving the user's identity without exposing any sensitive information. This authentication process is quick and convenient for the users and the merchants.

However, as the number of FIDO service providers in the industry grows, various difficulties have also risen. FIDO authentication supports various FIDO protocols and different FIDO service providers are often associated with different FIDO protocols. It is noted that these FIDO protocols are not compatible with each other, thus there exists a lack of interoperability between different FIDO service providers operating on mismatched FIDO protocols. This aspect has introduced friction in the FIDO authentication process for users leading to a poor user experience and a waste of resources as well. For example, a payment aggregator partnered with a FIDO service provider may authenticate a user for a utility bill payment. If the user is redirected to an insurance provider's checkout page that uses a different FIDO provider, the user may be prompted to authenticate again. This redundant re-authentication creates an unnecessary load on the payment network, resulting in a poor user experience and inefficient use of resources. Moreover, when users upgrade to new devices, they must re-authenticate across multiple services and platforms within the FIDO ecosystem. This process results in redundant authentication information being stored across different FIDO providers, leading to increased storage costs, decreased system performance, and potential compliance issues.

Hence, there is a technological need for providing methods and systems for enabling interoperability between different FIDO service providers while addressing the various disadvantages faced by the users and FIDO service providers described earlier.

SUMMARY

Various embodiments of the present disclosure provide methods and systems for enabling interoperability between different FIDO service providers such as a first FIDO service provider and a second FIDO service provider.

In an embodiment, a computer-implemented method for enabling interoperability between a first Fast Identity Online (FIDO) service provider and a second FIDO service provider is disclosed. The computer-implemented method performed by a server system includes receiving a mismatch resolution request including authentication information from a payment gateway for a FIDO authentication of a user. The mismatch resolution request indicates a FIDO protocol mismatch between the first FIDO service provider and the second FIDO service provider. The computer-implemented method further includes extracting a template associated with the second FIDO service provider from a plurality of templates from a database associated with the server system. The computer-implemented method includes mapping, by a rule-based model associated with the server system, the authentication information on the template. Further, the computer-implemented method includes transmitting a FIDO authentication request message including the template to the second FIDO service provider. Furthermore, upon receiving a FIDO authentication response message including an authentication successful flag from the second FIDO service provider, the computer-implemented method includes transmitting an authentication successful message to the payment gateway.

In another embodiment, a computer-implemented method for enabling interoperability between a first Fast Identity Online (FIDO) service provider and a second FIDO service provider is provided. The computer-implemented method performed by a server system includes receiving a mismatch resolution request including authentication information from a payment gateway for a FIDO authentication of a user. The mismatch resolution request indicates a FIDO protocol mismatch between the first FIDO service provider and the second FIDO service provider. The first FIDO service provider is associated with an aggregator application installed on a user device associated with the user and the second FIDO service provider is associated with the payment gateway of a merchant associated with the aggregator application. The computer-implemented method includes extracting a template associated with the second FIDO service provider from a plurality of templates from a database associated with the server system. The computer-implemented method further includes mapping, by a rule-based model associated with the server system, the authentication information on the template. The computer-implemented method includes transmitting a FIDO authentication request message including the template to the second FIDO service provider. Further, upon receiving a FIDO authentication response message including an authentication successful flag from the second FIDO service provider, the computer-implemented method includes transmitting an authentication successful message to an acquirer server associated with the merchant using the payment gateway.

In yet another embodiment, a computer-implemented method for enabling interoperability between a first Fast Identity Online (FIDO) service provider and a second FIDO service provider is provided. The computer-implemented method performed by a server system includes receiving a mismatch resolution request including authentication information from a payment gateway for a FIDO authentication of a user. The mismatch resolution request indicates a FIDO protocol mismatch between the first FIDO service provider and the second FIDO service provider. The first FIDO service provider is associated with at least one application installed on a user device associated with the user and the second FIDO service provider is associated with a new user device. The computer-implemented method includes extracting a new user device-specific template associated with the second FIDO service provider from a database associated with the server system. The computer-implemented method also includes mapping, by a rule-based model associated with the server system, the authentication information on the new user device-specific template. The computer-implemented method further includes transmitting a FIDO authentication request message including the new user device-specific template to the second FIDO service provider. Further, the computer-implemented method includes updating a user-device-specific template with the new user device-specific template on the new user device.

In another embodiment, a server system is disclosed. The server system includes a communication interface and a memory including executable instructions. The server system also includes a processor communicably coupled to the memory. The processor is configured to execute the instructions to cause the server system, at least in part, to receive a mismatch resolution request including authentication information from a payment gateway for a Fast Identity Online (FIDO) authentication of a user. The mismatch resolution request indicates a FIDO protocol mismatch between a first FIDO service provider and a second FIDO service provider. The server system is also caused to extract a template associated with the second FIDO service provider from a plurality of templates from a database associated with the server system. The server system is further caused to map, by a rule-based model associated with the server system, the authentication information on the template. The server system is further caused to transmit a FIDO authentication request message including the template to the second FIDO service provider. Further, upon receiving a FIDO authentication response message including an authentication successful flag from the second FIDO service provider, the server system is caused to transmit an authentication successful message to the payment gateway.

In yet another embodiment, a non-transitory computer-readable storage medium is disclosed. The non-transitory computer-readable storage medium includes computer-executable instructions that, when executed by at least a processor of a server system, cause the server system to perform a method. The method includes receiving a mismatch resolution request including authentication information from a payment gateway for a Fast Identity Online (FIDO) authentication of a user. The mismatch resolution request indicates a FIDO protocol mismatch between a first FIDO service provider and a second FIDO service provider. The method further includes extracting a template associated with the second FIDO service provider from a plurality of templates from a database associated with the server system. The method includes mapping, by a rule-based model associated with the server system, the authentication information on the template. Further, the method includes transmitting a FIDO authentication request message including the template to the second FIDO service provider. Furthermore, upon receiving a FIDO authentication response message including an authentication successful flag from the second FIDO service provider, the method includes transmitting an authentication successful message to the payment gateway.

As may be understood, the foregoing summary is illustrative only and is not intended to be in any way limiting. In addition to the illustrative aspects, embodiments, and features described above, further aspects, embodiments, and features will become apparent by reference to the figures/drawings and the following detailed description.

BRIEF DESCRIPTION OF THE FIGURES

For a more complete understanding of embodiments of the present technology, reference is now made to the following descriptions taken in connection with the accompanying drawings in which:

FIG. 6 illustrates a process flow diagram depicting a method for enabling interoperability between a first FIDO service provider associated with an aggregator application and a second FIDO service provider associated with a merchant such as merchant 108, in accordance with an embodiment of the present disclosure;

FIG. 7 illustrates a process flow diagram depicting a method for enabling interoperability between a first FIDO service provider associated with a user device such as user device and a second FIDO service provider associated with a new user device, in accordance with an embodiment of the present disclosure.

Figure 1:
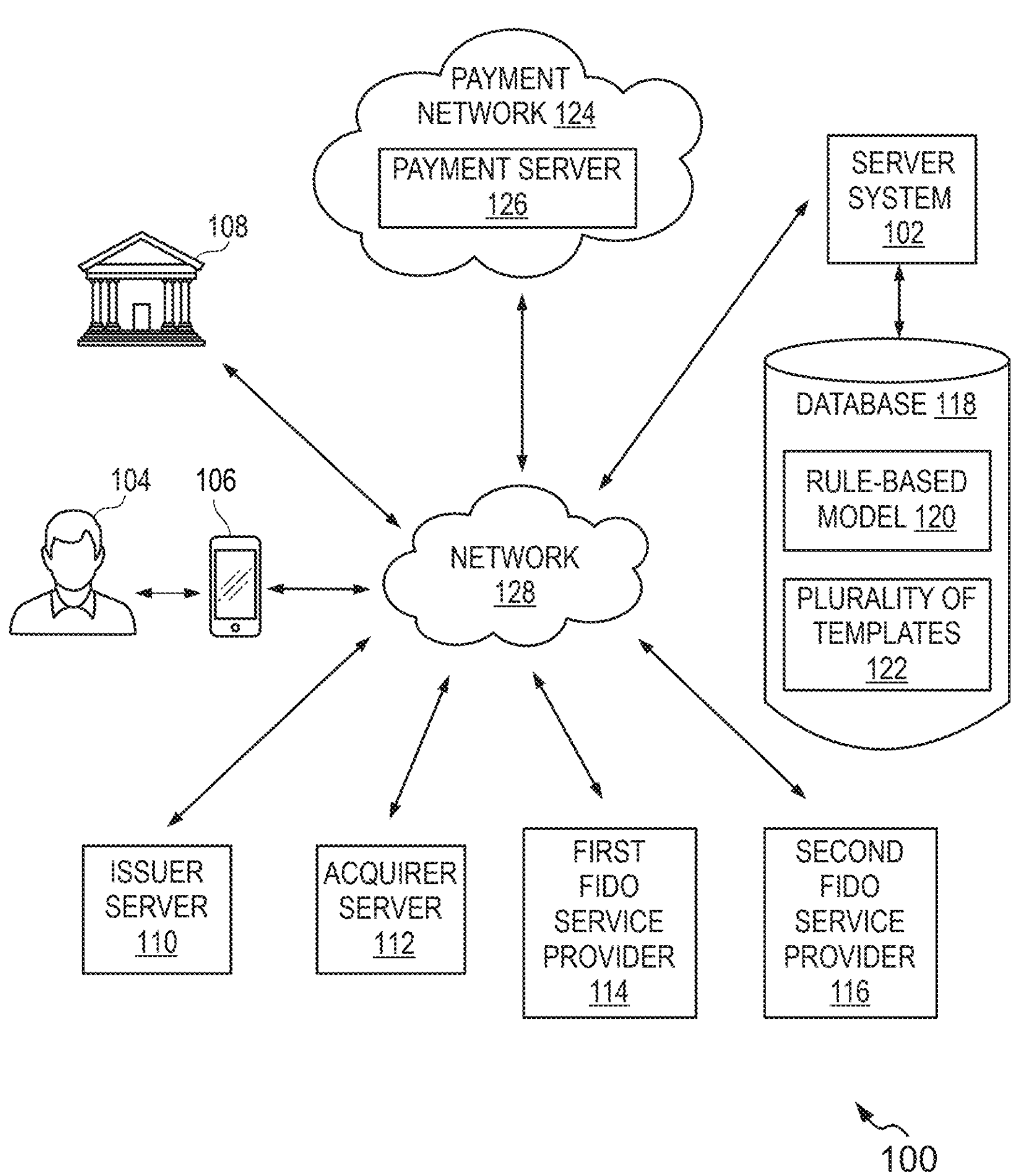
FIG. 1 illustrates an example representation of an environment, related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification does not necessarily all refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "issuer", used throughout the description, refers to a financial institution normally called an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server called "issuer server" throughout the description.

Further, the term "acquirer", refers to a financial institution (e.g., a bank) that processes financial transactions for merchants. In other words, this can be an institution that facilitates the processing of payment transactions for physical stores, merchants, or institutions that own platforms that make either online purchases or purchases made via software applications possible (e.g., the shopping cart platform providers and the in-app payment processing providers). The terms "acquirer", "acquiring bank", "acquiring bank" or "acquirer server" will be used interchangeably herein.

The term "payment account", used throughout the description, refers to a financial account that is used to fund the financial transaction (interchangeably referred to as "payment transaction" or "transaction"). Examples of the payment account include, but are not limited to, a savings account, a credit account, an e-wallet account, a checking account, and a virtual payment account. The payment account may be associated with an entity such as an individual person, a family, a commercial entity, a company, a corporation, a governmental entity, a non-profit organization, and the like. In some scenarios, a payment account may be a virtual or temporary payment account that can be mapped or linked to a primary payment account, such as those accounts managed by payment wallet service providers.

The term "payment network", used throughout the description, refers to a network or collection of systems used for the transfer of funds through the use of cash substitutes. Payment networks may use a variety of protocols and procedures in order to process the transfer of money for various types of transactions. Transactions that may be performed via a payment network may include product or service purchases, credit purchases, debit transactions, fund transfers, account withdrawals, etc. Payment networks may be operated to perform transactions via cash substitutes, which may include payment cards, letters of credit, checks, financial accounts, etc.

The term "payment card", used throughout the description, refers to a physical or virtual card linked with a financial or payment account that may be used to fund a financial transaction to a merchant or any such facility via the associated payment account. Examples of the payment cards include, but are not limited to, debit cards, credit cards, prepaid cards, virtual payment numbers, virtual card numbers, forex cards, charge cards, and stored-value cards. A payment card may be a physical card that may be presented to the merchant for funding the payment. Alternatively, or additionally, the payment card may be embodied in the form of data (e.g., a digital token) stored in a user device, where the data is associated with the payment account such that the data can be used to process the financial transaction between the payment account and a merchant's financial account.

The term "merchant", used throughout the description, may include a merchant that has a relationship with the payment processing network. The merchant may receive the proceeds from a purchase when the purchase is settled. The merchant is the company that is ultimately responsible for the financial transaction.

The term "application", used throughout the description, may refer to a software application associated with a particular merchant or may be associated with a number of different merchants. The merchant application may be capable of identifying a particular merchant (or multiple merchants) that is participating in a transaction with a user or cardholder. For instance, the merchant application may store information identifying a particular merchant server computer that is configured to provide a purchase environment in which the merchant server computer is capable of processing remote transactions initiated by the cardholder on the merchant application. Further, the merchant application may also include a general-purpose browser or other software-designed application configured to interact with multiple merchant server computers as long as the browser is configured to identify the merchant server computer and process a payment transaction. The merchant application may be installed on the general-purpose memory of an electronic device or user device of the user or cardholder. To that end, the merchant application is configured to allow a cardholder to perform a payment transaction with a merchant in exchange for goods or services.

The term "payment service provider", may include an entity that contracts with an acquirer for the purpose of providing acceptance to a merchant, the merchant then contracts with a payment service provider to obtain payment services.

Overview

Various embodiments of the present disclosure provide methods, systems electronic devices, and computer program products for enabling interoperability between a first Fast Identity Online (FIDO) service provider and a second FIDO service provider. In a specific embodiment, the server system can be embodied within a payment server associated with a payment gateway. The server system includes a processor and a memory. In a non-limiting implementation, the server system may receive a mismatch resolution request for a FIDO authentication of a user. The mismatch resolution request may include authentication information. In an embodiment, the mismatch resolution request is received from the payment gateway. The mismatch resolution request may indicate a FIDO protocol mismatch between a first FIDO service provider and a second FIDO service provider.

Further, the server system can extract a template associated with the second FIDO service provider from a plurality of templates from a database associated with the server system. More specifically, the server system may access FIDO-related information from each FIDO service provider of a plurality of FIDO service providers. Herein, the plurality of FIDO service providers may include at least the first FIDO service provider and the second FIDO service provider. Further, the server system may generate the plurality of templates for the plurality of FIDO service providers based, at least in part, on the corresponding FIDO-related information. Herein, each FIDO service provider is associated with at least one template from the plurality of templates. The server system may then store the plurality of templates in the database which are accessible for future use. In one embodiment, the server system generates the plurality of templates using a rule-based model associated with the server system.

In one embodiment, for extracting the template associated with the second FIDO service provider, the server system determines at least one template associated with the second FIDO service provider from the plurality of templates. Further, the server system may select the template from the at least one template based, at least on, the template being associated with a highest success rate for the second FIDO service provider. Thus, it may be understood that the server system also tracks a success rate of each template of at least one template associated with a corresponding FIDO service provider which is explained in detail further in the present disclosure.

Furthermore, the server system can map the authentication information on the template. In one embodiment, the server system maps the authentication information on the template using the rule-based model. More specifically, for mapping the authentication information on the template, the server system may extract one or more authentication parameters from the authentication information. Herein, the authentication information is received by the payment gateway from the first FIDO service provider. Further, the server system may assign at least one of the one or more authentication parameters to the template, Herein, if the template includes at least one mandatory field that cannot be assigned an authentication parameter from the one or more authentication parameters, the server system is configured to perform a set of fallback operations.

In a non-limiting example, the set of fallback operations may include: (i) determining if a historically successful authentication with the authentication parameter has been performed by the user on the user device within a predefined time interval; and (ii) upon determining that the historically successful authentication has been performed, assigning the authentication parameter received during the historically successful authentication to a corresponding mandatory field from the at least one mandatory field. Herein, the steps of determining and assigning the authentication parameter are repeated for each of the remaining mandatory fields in the at least one mandatory field.

In another non-limiting example, the set of fallback operations may include: (i) upon determining that the historically successful authentication has not been performed, facilitating an alternative authentication process for the user on the user device based, at least in part, on the at least one mandatory field; (ii) in response to completion of the alternative authentication process by the user, receiving alternative authentication information from the user device, the alternative authentication information including at least one authentication parameter; and (iii) assigning the at least one authentication parameter to the corresponding at least one mandatory field based, at least in part, on the alternative authentication information.

In another embodiment, for extracting the template associated with the second FIDO service provider, the server system accesses new device-related information from a new user device of the user. Further, the server system may select a new user device-specific template associated with the new user device from the database as the template based, at least in part, on the new device-related information.

In a non-limiting implementation, for mapping the authentication information on the template, the server system may extract one or more authentication parameters from the authentication information. Herein, the authentication information is received by the payment gateway from the first FIDO service provider. Then, the server system is configured to access a user device-specific template from the database, the user device-specific template including one or more fields. Further, the server system may assign at least one of the one or more authentication parameters and at least one of the one or more fields on the template. Thereafter, the server system is configured to transmit the new user device-specific template to the new user device.

Herein, the template is a new user device-specific template. More specifically, if the template includes at least one mandatory field that cannot be assigned an authentication parameter from the one or more authentication parameters, the server system is configured to perform a set of fallback operations.

In a non-limiting example, the set of fallback operations may include: (i) determining if a historically successful authentication with the authentication parameter has been performed by the user on the user device within a predefined time interval; and (ii) upon determining that the historically successful authentication has been performed, assigning the authentication parameter received during the historically successful authentication to a corresponding mandatory field from the at least one mandatory field. Herein, the steps of determining and assigning the authentication parameter are repeated for each of the remaining mandatory fields in the at least one mandatory field.

In another non-limiting example, the set of fallback operations may include: (i) upon determining that the historically successful authentication has not been performed, facilitating an alternative authentication process for the user on the new user device based, at least in part, on the at least one mandatory field; (ii) in response to completion of the alternative authentication process by the user receiving alternative authentication information from the new user device, the alternative authentication information including at least one authentication parameter; and (iii) assigning the at least one authentication parameter to the corresponding at least one mandatory field based, at least in part, on the alternative authentication information.

In addition, the server system can transmit a FIDO authentication request message including the template to the second FIDO service provider, upon receiving a FIDO authentication response message including an authentication successful flag from the second FIDO service provider. The server system may transmit an authentication unsuccessful message to the payment gateway upon receiving a FIDO authentication response message. As described earlier, the server system can track the success rate of each template associated with each FIDO service provider. Thus, in an embodiment, the server system may track the success rate based, at least in part, on the FIDO authentication response message received for each FIDO authentication performed for a plurality of users.

In another non-limiting implementation, the server system may receive a mismatch resolution request including authentication information from a payment gateway for a FIDO authentication of a user. The mismatch resolution request may indicate a FIDO protocol mismatch between a first FIDO service provider and a second FIDO service provider. Herein, the first FIDO service provider is associated with an aggregator application installed on a user device associated with the user and the second FIDO service provider is associated with the payment gateway of a merchant associated with the aggregator application. Further, the server system can extract a template associated with the second FIDO service provider from a plurality of templates from a database associated with the server system. Furthermore, the server system can map the authentication information on the template by a rule-based model associated with the server system. Further, the server system can transmit a FIDO authentication request message including the template to the second FIDO service provider. Furthermore, the server system can transmit an authentication successful message to an acquirer server associated with the merchant using the payment gateway upon receiving a FIDO authentication response message including an authentication successful flag from the second FIDO service provider.

In yet another non-limiting implementation, the server system may receive a mismatch resolution request including authentication information from a payment gateway for a FIDO authentication of a user. The mismatch resolution request indicates a FIDO protocol mismatch between a first FIDO service provider and a second FIDO service provider. Herein, the first FIDO service provider is associated with at least one application installed on a user device associated with the user and the second FIDO service provider is associated with a new user device. Further, the server system can extract a new user device-specific template associated with the second FIDO service provider from a database associated with the server system. Furthermore, the server system can map the authentication information on the new user device-specific template by a rule-based model associated with the server system. Further, the server system can transmit a FIDO authentication request message including the new user device-specific template to the second FIDO service provider. Further, the server system can update a user-device-specific template with the new user device-specific template on the new user device.

Various embodiments of the present disclosure provide multiple advantages and technical effects while addressing technical problems such as how to enable interoperability between different FIDO service providers. Various embodiments described herein address this technical problem by providing an Artificial Intelligence (AI) based solution for enabling interoperability between different FIDO providers.

As may be appreciated, by using a template supported by the second FIDO service provider generated using the authentication information from the first FIDO service provider, a transaction can be processed seamlessly without requiring the user to re-authenticate themselves. This aspect helps in improving the user experience while reducing the number of messages that have to be shared back and forth between different entities during FIDO authentication in turn saving processing resources and reducing burden on the payment network. Additionally, using the new user device-specific template can automatically update the FIDO credentials for the new device, thus saving the user from manually re-registering on different application. Further, this aspect can help update and remove redundant data from servers and devices, thus leading to efficient use of storage. Furthermore, the set of fallback operations ensure that an ongoing authentication process is not dropped or canceled immediately upon encountering missing data. These fallback operations help to reduce the burden on the payment network due to failed transactions by reducing the overall number of authentication failures.

Various embodiments of the present disclosure are described hereinafter with reference to FIGS. 1 to 8.

FIG. 1 illustrates an exemplary representation of an environment 100 related to at least some embodiments of the present disclosure. Although the environment 100 is presented in one arrangement, other embodiments may include the parts of the environment 100 (or other parts) arranged otherwise depending on, for example, enabling interoperability between different FIDO service providers, and so on. The environment 100 generally includes a server system 102, a user 104, a user device 106 associated with the user 104, a merchant 108, an issuer server 110, an acquirer server 112, a first Fast Identity Online (FIDO) service provider 114, a second FIDO service provider 116, a payment network 124 including a payment server 126, and a database 118, each coupled to, and in communication with (and/or with access to) a network 128. The network 128 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 128 in accordance with various wired and wireless communication protocols, such as Transmission Control Protocol and Internet Protocol (TCP/IP), User Datagram Protocol (UDP), 2$^{nd}$ Generation (2G), 3$^{rd}$ Generation (3G), 4$^{th}$ Generation (4G), 5$^{th}$ Generation (5G) communication protocols, Long Term Evolution (LTE) communication protocols, any combination thereof or any future communication protocols. For example, the network 128 may include multiple different networks, such as a private network or a public network (e.g., the Internet, etc.) through which the server system 102, the issuer server 110, the acquirer server 112, the first FIDO service provider 114, the second FIDO service provider 116, and the payment server 126 may communicate.

In an embodiment, the user (e.g., the user 104) may be any individual, representative of a corporate entity, non-profit organization, or any other person who is presenting payment account details or payment card details during an electronic payment transaction. The user 104 may have a payment account issued by an issuing bank (not shown in figures) and may be provided a payment card with financial or other account information encoded onto the payment card such that the user 104) may use the payment card associated with a payment account at the issuing bank to initiate and complete a payment transaction. Generally, the term "payment transaction" refers to an agreement that is carried out between a buyer and a seller to exchange assets for a form of payment (e.g., cash, currency, etc.). For example, the user 104 may enter details of the payment card on an e-commerce platform to buy goods or products. In an example, the user 104 may transact at the merchant 108.

The user 104 may be associated with the user device 106 and may use the user device 106 to access a mobile application or a website associated with the issuing bank, a merchant 108, or any third-party payment application to perform a transaction. In an instance, the user device 106 may be equipped with the necessary sensor or array of sensors for gathering the required biometric information from the user 104. For instance, the user device 106 may include a capacitive fingerprint scan sensor, an ultrasound fingerprint scan sensor, an iris scanner, camera modules, a 3D face scan sensor array, a heartbeat sensor, and the like for gathering biometric information of the user 104.

In various non-limiting examples, the user device 106 may include any portable communication devices such as a smartphone, tablet, personal digital assistant (PDA), phablet, wearable device, smart watch, laptop computer, an augmented reality (AR) headset, a virtual reality (VR)

headset, and the like. In some other examples, the user device 106 may include any fixed communication device such as a desktop, mainframe computer, workstation, and the like. In one exemplary implementation, the user device 106 may be equipped with one or more applications (such as an instance of an aggregator application, a merchant application associated with the merchant 108, or any other application) for communicating with the server system 102 over the network 128. In particular, one or more applications may be installed on the user device 106 by the user 104. Further, the one or more applications may be capable of communicating with the server system 102. In various non-limiting examples, the one or more applications may correspond to a web browser, an application associated with the issuer server 110, an application associated with the merchant 108, an application programming interface (API) associated with the issuer server 110, an application associated with the server system 102, an API associated with the server system 102, and the like.

In one scenario, the user 104 may use their corresponding payment card to conduct payment transactions with the merchant 108. In an example, the user 104 may enter payment card details on a mobile device to perform an online payment transaction. In another example, the user 104 may utilize a payment card to perform an offline payment transaction. The user 104 may be called a cardholder as well.

In one embodiment, the user 104 may be associated with the issuer server such as issuer server 110. In one embodiment, the issuer server 110 is associated with a financial institution normally called an "issuer bank", "issuing bank" or simply "issuer", in which a user (e.g., the user 104) may have a payment account, (which also issues a payment card, such as a credit card or a debit card), and provides microfinance banking services (e.g., payment transaction using credit/debit cards) for processing electronic payment transactions, to the user 104). In another embodiment, the issuing bank may also provide an issuer application that may be installed by the user 104 on their user device 106. The issuer application may provide a plurality of banking-related facilities to the user 104. In particular, the issuer application may enable the user 104 to avail various services offered by the issuer through the issuer server 110. For instance, the user 104 may use the issuer application to check their account balance and account statements and manage their payment account and one or more payment cards provided by the issuer.

In an embodiment, the merchant 108 may include retail shops, restaurants, supermarkets or establishments, government and/or private agencies, or any such places equipped with POS terminals, where users visit to perform the financial transaction in exchange for any goods and/or services or any financial transactions. In another embodiment, the merchant 108 may provide an application that may be installed by a user 104 on their user device 106. The application may enable the user 104 to perform a payment transaction in exchange for goods or services with the merchant 108. The application may enable the user 104 to perform the payment transaction through various methods such as using payment cards, Net-banking, Unified Payments Interface (UPI), Cash-On-Delivery (COD), and so on.

In an embodiment, the merchant 108 is associated with an acquirer server (e.g., the acquirer server 112). In one embodiment, the acquirer server 112 is associated with a financial institution (e.g., a bank) that processes financial transactions. This can be an institution that facilitates the processing of payment transactions for physical stores, merchants (e.g., the merchant 108), or institutions that own platforms that make either online purchases or purchases made via software applications possible (e.g., shopping cart platform providers and in-app payment processing providers). The terms "acquirer", "acquiring bank", "acquiring bank" or "acquirer server" will be used interchangeably herein.

In some scenarios, the application may include a mobile application or "app" that can be installed by the user 104 on their user device 106. The application may also include a "plug-in" or an "extension" to another application, such as a pre-existing application (i.e., a third-party application) or API associated with the third-party application. In an implementation, the application may be managed, hosted, or executed by the server system 102. In another implementation, the application is managed, hosted, or executed by a communication device (not shown in figures) associated with the merchant 108. In this scenario, the application is able to communicate with the server system 102 to perform various operations (described later on).

In an embodiment, the issuer application may be configured to generate one or more graphical user interfaces in response to communication with the server system 102 for facilitating a Multi-Factor Authentication (such as 2FA) of a cardholder (such as user 104).

In one embodiment, the user device 106 is communicably coupled with the merchant 108 or different merchants through the network 128 is capable of interacting with the application. The application may communicate with the various entities shown in FIG. 1 through a web browser or an application programming interfaces (APIs) installed on the user device 106. In other words, the user device 106 of the user 104 is capable of performing one or more operations using the application. In one implementation, the application utilizes communication APIs to communicate back and forth with the user device 106. In an example, the application utilizes various distribution methods for sharing one or more messages, requests, or responses with the user device 106 of the user 104, the merchant 108, the server system 102, and the like. In various non-limiting examples, the distribution methods may include short message service (SMS), electronic mail (email), communication APIs, embeddable widgets, and the like. In an example, the application utilizes communication APIs to share the results of their various operations (described later on) with the server system 102, or the user device 106. Herein, it is understood that the term "API" generally refers to a set of programming standards and/or instructions for web-based applications and tools. For instance, "communication APIs" refer to APIs specifically designed to enable communication (e.g., voice calls, e-mail functionality, third-party messaging functionality, other communication functionality, etc.).

In an embodiment, the first Fast Identity Online (FIDO) service provider 114 refers to an institution that enables any online service provider to authenticate the identity of its users (such as the user 104) safely and securely. In particular, the first FIDO service provider 114 is capable of registering, storing, and authenticating information related to the identity of different users. For instance, FIDO service provider 114 may register and store a digital identity of a user such as user 104 using their authentication information such as biometric information (for example, fingerprints, etc.). In another instance, the first FIDO service provider 114 is also capable of facilitating the validation or authenticating the identity of user 104 based on comparing the registered biometric information with new biometric information received from the user 104 locally on the user device 106.

For instance, if a user 104 is registered using a first facial scan and then provides a second facial scan at a later instance, the first FIDO service provider 114 facilitates a FIDO authenticator associated with either the user device 106 or the application to generate a template of the first face scan with obtained during the registration process. Further, upon successful registration, a private key is generated and stored locally by the FIDO authenticator on the user device 106. Further, the FIDO authenticator generates and shares a public key with the first FIDO service provider 114.

Then, to authenticate the user 104, the second facial scan is compared with the template of the first face scan. If the comparison is successful, the second FIDO service provider 114 transmits a challenge to the user device 106. Upon receiving the challenge, the user device 106 utilizes a private key to solve the challenge, then the user device 106 sends the solved challenge to the first FIDO service provider 114. The first FIDO service provider 114 utilizes the public key to validate the user 106 based on the solved challenge. In an implementation, the first FIDO service provider 114 may operate using a FIDO protocol. The FIDO protocol is a set of standards developed to provide secure, easy-to-use authentication methods. It aims to reduce the reliance on passwords by using stronger and more secure alternatives, such as biometrics, hardware tokens, and other forms of multi-factor authentication (MFA). Examples of FIDO protocols include Universal Authentication Framework (UAF), Universal second Factor (U2F), and FIDO2. UAF focuses on password less authentication using biometric methods such as fingerprints or facial recognition. U2F provides a second-factor authentication solution using physical security keys, enhancing security by requiring both a password and the physical key. FIDO2, which includes the Web Authentication (WebAuthn) standard and the Client to Authenticator Protocol (CTAP), enables password less, second-factor, and multi-factor authentication through both hardware tokens and biometric methods, aiming for a more secure and user-friendly experience across various devices and platforms.

In an embodiment, the second FIDO service provider 116 refers to another institution (different from the first FIDO service provider 114) that enables any online service provider to authenticate the identity of its users (such as the user 104) safely and securely. It is noted that the second FIDO service provider 116 is similar to the first FIDO service provider 114 in its operation therefore the same is explained again. It is noted that the difference between the second FIDO service provider 116 and the first FIDO service provider 114 is FIDO protocol used for operating the FIDO service. In other words, the second FIDO service provider 116 operates using a distinct FIDO protocol.

In one embodiment, the payment network 124 may be used by the payment card issuing authorities as a payment interchange network. Examples of payment interchange networks include but are not limited to, interchange networks operated by payment processors. The interchange network is a communications standard for the exchange of electronic payment transaction data between issuers and acquirers associated with the payment processors.

As described earlier, FIDO service providers operating on different protocols are not compatible with each other thus, there exists a need to enable interoperability between different FIDO providers. To that end, for overcoming the various technical problems and disadvantages described earlier, the present disclosure provides a server system 102 that is configured to perform one or more operations for addressing these technical problems.

In an embodiment, the one or more operations performed by the server system 102 facilitate the authentication of the user 104 safely and securely with different FIDO service providers. In an exemplary scenario, when the user 104 wishes to perform a transaction using an application such as an aggregator application, the user 104 can authenticate themselves with the aggregator application. The term aggregator application refers to an application that aggregates services and products from various merchants at a common marketplace within the same application. The aggregator application might be associated with the first FIDO service provider 114 that utilizes a first FIDO protocol to authenticate the user 104. Upon successful authentication, the user 104 can select a merchant such as merchant 108 to perform a transaction. The said merchant can redirect the user 104 to a payment gateway associated with the second FIDO service provider 116. Since, the second FIDO service provider 116 can be associated with a second FIDO protocol, i.e., different from the first FIDO protocol, the payment gateway may detect this mismatch in the FIDO protocol and transmit a mismatch resolution request indicating a FIDO protocol mismatch between the first FIDO service provider 114 and the second FIDO service provider 116. In an instance, the mismatch resolution request may include authentication information associated with the user 104. Examples of authentication information may include one or more parameters such as but not limited to user authentication credentials, session token(s), a user identifier (ID), transaction information, device information, authentication context, metadata, and the like. Here, user authentication credentials may include credentials that were initially used to authenticate the user with the first FIDO service provider, such as public keys or signed authentication assertions. Session tokens refer to tokens generated during the user's session with the first FIDO service provider. They help maintain the continuity of the authentication session when the user transitions to the second FIDO service provider. The user ID is a unique identifier associated with the user that helps to recognize the user across different FIDO service providers. The transaction details refer to one or more transaction attributes associated with each transaction such as the transaction amount, merchant details, and timestamp. This ensures that the context of the transaction is preserved when switching between FIDO protocols. The device information refers to data about the user's device, such as device ID, type, and security capabilities. This information can be critical for risk assessment and ensuring compatibility with the second FIDO service provider. The authentication context includes the specific context in which the authentication was performed, such as the method of authentication (e.g., biometric, PIN), the level of assurance, and any associated security policies. The metadata refers to the additional metadata that can include the version of the FIDO protocol used, the security settings, and any other relevant configurations.

In an embodiment, the server system 102 is associated with a database such as database 118. In an implementation, the database 118 may include a rule-based model 120, a plurality of templates 122, and so on. The rule-based model 120 is an Artificial Intelligence (AI) or Machine Learning (ML) model that relies on a set of predefined rules or logic to make decisions or predictions. Unlike statistical or data-driven models, which learn patterns from data, rule-based models operate based on explicit instructions provided by human experts. For instance, the rule-based model 120 may be configured to generate the plurality of templates 122 for the plurality of FIDO service providers based, at least in part, on the corresponding FIDO-related information obtained from each FIDO service provider such as first FIDO service provider 114 and the second FIDO service provider 116. Each of the plurality of templates 122 refer to data structures specific to a FIDO protocol that are required to authenticate the user 104 by a FIDO service provider using the said FIDO protocol.

In various non-limiting examples, the database 118 may include one or more hard disk drives (HDD), solid-state drives (SSD), an Advanced Technology Attachment (ATA) adapter, a Serial ATA (SATA) adapter, a Small Computer System Interface (SCSI) adapter, a redundant array of independent disks (RAID) controller, a storage area network (SAN) adapter, a network adapter, and/or any component providing the server system 102 with access to the database 118. In one implementation, the database 118 may be viewed, accessed, amended, updated, and/or deleted by an administrator (not shown) associated with the server system 102 through a database management system (DBMS) or relational database management system (RDBMS) present within the database 118.

In an embodiment, the server system 102 is configured to receive the mismatch resolution request including authentication information from the payment gateway for FIDO authentication of the user 104. In response, the server system 102 is configured to extract a template associated with the second FIDO service provider 116 from the plurality of templates 122 from the database 118. Then, the server system 102 is configured to map the authentication information on the template. In particular, the server system 102 is configured to utilize the rule-based model 120 to map the authentication information on the template. This aspect has been described in detail later in the present disclosure. Upon mapping, the server system 102 is configured to transmit a FIDO authentication request message including the template to the second FIDO service provider 116. Upon receiving a FIDO authentication response message including an authentication successful flag from the second FIDO service provider 116, the server system 102 is configured to transmit an authentication successful message to the payment gateway. As may be appreciated, since the template is compatible with the second FIDO service provider 114, the user 104 can be authenticated for the transaction.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
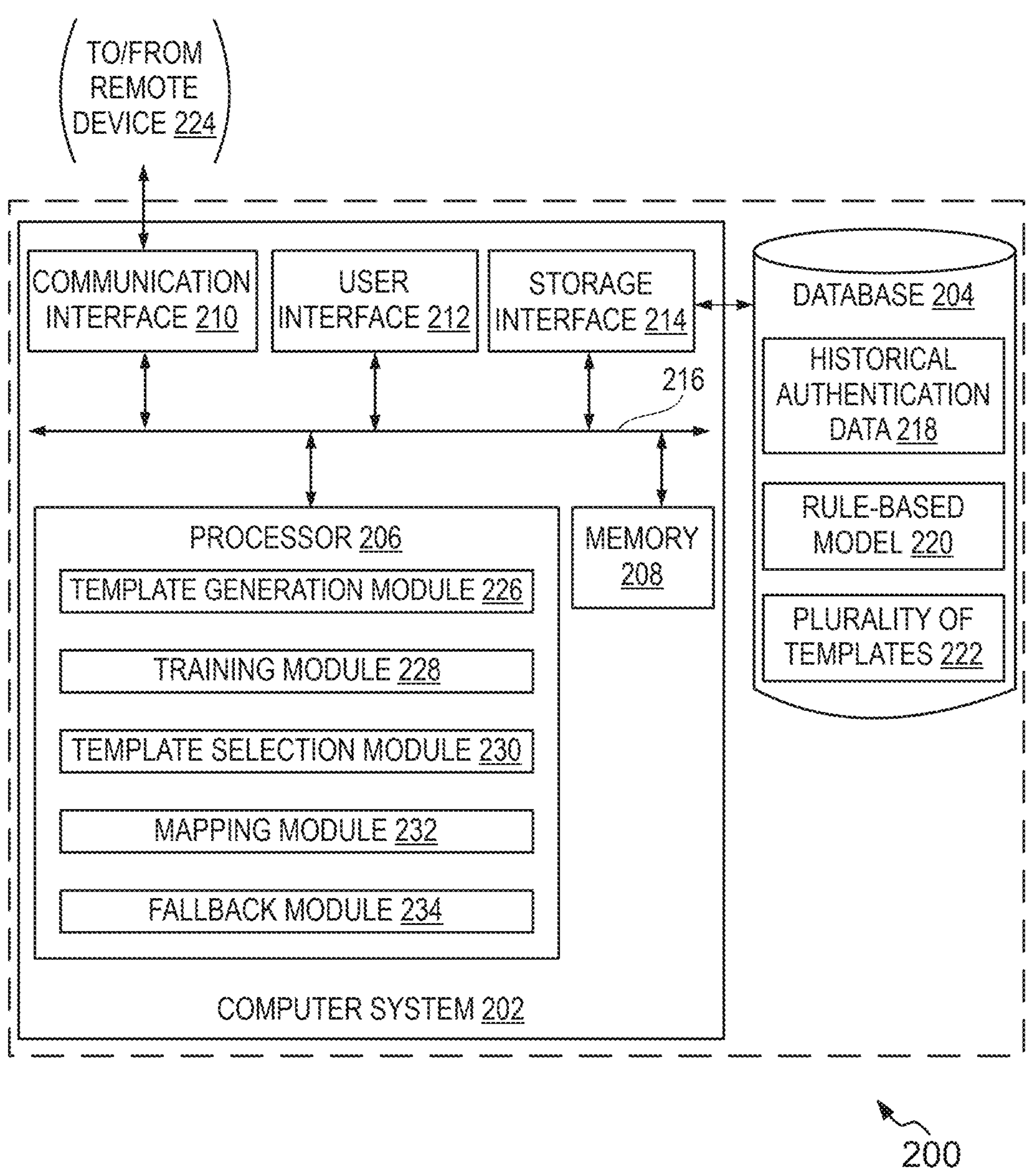
FIG. 2 illustrates a simplified block diagram of a server system, in accordance with an embodiment of the present disclosure.

FIG. 2 illustrates a simplified block diagram of a server system 200, in accordance with an embodiment of the present disclosure. The server system 200 is similar to the server system 102. In some embodiments, the server system 200 is embodied as a cloud-based and/or SaaS-based (software as a service) architecture. In one embodiment, the server system 200 is a part of the payment network 112 or is integrated within the payment server 126. In another embodiment, the server system 200 is embodied within the issuer server 110. In yet another embodiment, the server system 200 is embodied within the acquirer server 112.

The server system 200 includes a computer system 202 and a database 204. The computer system 202 includes at least one processor 206 for executing instructions, a memory 208, a communication interface 210, a storage interface 214, and a user interface 212 that communicate with each other via a bus 216.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In some embodiments, the database 204 is integrated into the computer system 202. In one embodiment, the database 204 is substantially similar to the database 118 of FIG. 1. In one non-limiting example, the database 204 is configured to store historical authentication data 218, a rule-based model 220, a plurality of templates 222, and so on. It is noted that the rule-based model 220 and the plurality of templates 222 are identical to the rule-based model 120 and the plurality of templates 122 of FIG. 1. Therefore, they are not described again for the sake of brevity.

Further, the computer system 202 may include one or more hard disk drives as the database 204. In some embodiments, the database 204 is integrated within the computer system 202. The storage interface 214 is any component capable of providing the processor 206 with access to the database 204.

The user interface 212 is an interface such as a Human Machine Interface (HMI) or a software application that allows users such as an administrator (not shown) to interact with and control the server system 102 or one or more parameters associated with the server system 102. It may be noted that the user interface 212 may be composed of several components that vary based on the complexity and purpose of the application. Examples of components of the user interface 212 may include visual elements, controls, navigation, feedback and alerts, user input and interaction, responsive design, user assistance and help, accessibility features, and the like. More specifically these components may correspond to icons, layout, color schemes, buttons, sliders, dropdown menus, tabs, links, error/success messages, mouse and touch interactions, keyboard shortcuts, tooltips, screen readers, and the like.

The processor 206 includes suitable logic, circuitry, and/or interfaces to execute operations for enabling interoperability between different FIDO service providers for authenticating a user 104, and the like. Examples of the processor 206 include, but are not limited to, an Application-Specific Integrated Circuit (ASIC) processor, a reduced instruction set computing (RISC) processor, a Complex Instruction Set Computing (CISC) processor, a Field-Programmable Gate Array (FPGA), and the like.

The memory 208 includes suitable logic, circuitry, and/or interfaces to store a set of computer-readable instructions for performing operations described herein. Examples of the memory 208 include a Random-Access Memory (RAM), a Read-Only Memory (ROM), a removable storage drive, a Hard Disk Drive (HDD), and the like. It will be apparent to a person skilled in the art that the scope of the disclosure is not limited to realizing the memory 208 in the server system 200, as described herein. In another embodiment, the memory 208 may be realized in the form of a database server or a cloud storage working in conjunction with the server system 102, without departing from the scope of the present disclosure.

The processor 206 is operatively coupled to the communication interface 210 such that the processor 206 is capable of communicating with a remote device 224 such as, the POS machine associated with any merchant such the merchant 108, the aggregator application, any application installed on the user device 106 or communicating with any user such as the user 104 connected to the network 128 (as shown in FIG. 1). It is noted that the server system 102 as illustrated and hereinafter described is merely illustrative of an apparatus that could benefit from embodiments of the present disclosure and, therefore, should not be taken to limit the scope of the present disclosure. It is noted that the server system 102 may include fewer or more components than those depicted in FIG. 2.

In one embodiment, the processor 206 includes a template generation module 226, a training module 228, a template selection module 230, a mapping module 232, a fallback module 234, etc., among other suitable modules for performing the various operations described herein. It should be noted that the components, described herein, can be configured in a variety of ways, including electronic circuitries, digital arithmetic and logic blocks, and memory systems in combination with software, firmware, and embedded technologies. Moreover, it may be noted that the template generation module 226, the training module 228, the template selection module 230, the mapping module 232, and the fallback module 234 may be communicably coupled with each other to exchange information with each other for performing the one or more operations facilitated by the server system 200.

In an embodiment, the template generation module 226 includes suitable logic and/or interfaces for accessing FIDO-related information from each FIDO service provider of a plurality of FIDO service providers. In an example, the FIDO-related information may include details regarding at least a FIDO protocol and a FIDO related requirements of each FIDO service provider. In particular, the template generation module 226 is configured to request each FIDO service provider for the FIDO-related information. In response to this request, each FIDO service provider may share or transmit its corresponding FIDO-related information with the template generation module 226.

The template generation module 226 can be configured to store and maintain a record of the FIDO-related information in the database 204. This record may be updated periodically to ensure that the FIDO-related information of each FIDO service provider remains valid and up to date. Once, the record is created, the template generation module 226 may access it for generating the plurality of templates 222 as required. In other words, upon accessing the FIDO-related information, the template generation module 226 is configured to generate the plurality of templates 222 for the plurality of FIDO service providers based, at least in part, on the corresponding FIDO-related information. In a non-limiting example, the template generation module 226 is configured to utilize the rule-based model 220 to generate the plurality of templates 222. It is noted that each FIDO service provider is associated with at least one template from the plurality of templates 222. Further, the plurality of FIDO service providers may include at least the first FIDO service provider 114 and the second FIDO service provider 116.

In an embodiment, the training module 228 includes suitable logic and/or interfaces for training the rule-based model 220 based, at least in part, on the historical authentication data 218.

In particular, the training module 228 is configured to train the rule-based model 220 based, at least in part, on the historical authentication data 218 and the FIDO-related information. The historical authentication data 218 is collected from various FIDO service providers. In various examples, the historical authentication data 218 may include but is not limited to successful and unsuccessful authentication attempts, transaction details, device information, user behavior patterns, and so on. The FIDO-related information is received from different FIDO service providers. In various examples, the FIDO-related information includes information such as protocols used, authentication requirements, metadata, and so on.

Further, the training module 228 is configured to perform data pre-processing operations on the historical authentication data 218 and the FIDO-related information. These operations include normalization and data filtering. The historical authentication data 218 and the FIDO-related information are normalized to ensure consistency. For instance, different formats of timestamps within the data are converted to a standard format. Data filtering ensures that irrelevant or redundant data points are filtered out. This ensures that only meaningful data is used for training. As may be understood, to train the rule-based model 220, rule extraction and rule refinement have to be performed. In rule extraction, an initial set of rules is formulated using domain knowledge and historical data analysis. These rules define the conditions under which certain actions should be taken, such as authenticating a user or triggering additional security checks. In an instance, the set of rules is predefined by an administrator (not shown) associated with the server system 200. In rule refinement, the set of rules is refined through iterative testing and feedback. This involves adjusting the conditions and outcomes based on observed performance. In various examples, the set of rules may include but are not limited to authentication rules, transaction rules, device rules, and so on. Examples of authentication rules include biometric match, i.e., if a biometric match is found, authenticate the user, multi-factor authentication, i.e., if a single factor fails, prompt for a secondary authentication method, and so on. Examples of transaction rules include transaction amount (for instance, for transactions exceeding a certain threshold, trigger additional verification), merchant risk level (for instance, for transactions with high-risk merchants requiring more stringent authentication), and so on. Examples of device rules include trusted device rules (for instance, if the user is on a trusted device, streamline the authentication process), new device rules (for instance, for new devices, initiate a full authentication process, and so on. In some instances, the model is configured to request the administrator to add a new rule in the set of rules if an exception is encountered by the model. Thus, the model can address cases associated with exception handling.

During the training process, the training module 228 configures the rule-based model 220 to apply the set of rules to the preprocessed historical data. Each rule is evaluated to determine its effectiveness in predicting correct authentication outcomes. Then, the rule-based model 220 is configured to iteratively adjust the weights and priorities of different rules based on their performance. This involves learning which rules are most effective in various scenarios. Once, the performance of the rule-based model 220 saturates between different iterations (in other words, does not increase between different iterations), the training process is concluded. Then, the training module 228 is configured to validate the trained model, i.e., the rule-based model 220. The validation stage includes the steps of cross-validation and metrics computation. During cross-validation, the rule-based model 220 is validated using cross-validation techniques, where the dataset is divided into training and validation subsets. This helps in assessing the model's performance and avoiding overfitting. During metric computation, metrics such as accuracy, precision, recall, and F1-score are used to evaluate the model's performance. These metrics help in understanding how well the model generalizes to new data.

In another embodiment, the training module 228 is configured to perform periodic updates to the rule-based model 220. In other words, rule-based model 220 is periodically retrained using new data to incorporate emerging patterns and trends. This ensures that the model remains up-to-date and effective. Further, a feedback loop can be established as well where the performance of the model is continuously monitored, and adjustments are made as needed.

Further, the training module 228 is configured to track a success rate of each template of at least one template associated with a corresponding FIDO service provider. It is noted that the success rate is tracked based, at least in part, on the FIDO authentication response message received for each FIDO authentication performed for a plurality of users. This aspect is described later in the present disclosure.

In an embodiment, the template selection module 230 includes suitable logic and/or interfaces for receiving a mismatch resolution request including authentication information from a payment gateway for a FIDO authentication of a user such as user 104. The mismatch resolution request indicates a FIDO protocol mismatch between a first FIDO service provider 114 and a second FIDO service provider 116. The process for generation and transmission of the mismatch resolution request to server system 200 by the payment gateway has been described earlier, therefore the same is not explained again for the sake of brevity.

Further, the template selection module 230 is configured to extract a template associated with the second FIDO service provider from the plurality of templates 222 from the database 204. In a first non-limiting scenario, the mismatch resolution request may be received due to mismatch between the FIDO service provider of the aggregator application, i.e., the first FIDO service provider 114 and a FIDO service provider of the payment gateway, i.e., the second FIDO service provider 116 associated with the merchant with whom the user 104 wishes to perform a transaction. In this scenario for extracting the template, the template selection module 230 is configured to determine at least one template associated with the second FIDO service provider from the plurality of templates 222. Then, the template selection module 230 is configured to select the template from the at least one template based, at least on, the template being associated with a highest success rate for the second FIDO service provider 116. This aspect has been described in later with reference to FIG. 4 in the present disclosure.

In a second non-limiting scenario, the mismatch resolution request may be received due to mismatch between the FIDO service providers due to the user 104 switching from an old user device to a new user device. In this scenario for extracting the template, the template selection module 230 is configured to access new device-related information from a new user device of the user. Then, the template selection module 230 is configured to select a new user device-specific template associated with the new user device from the database as the template based, at least in part, on the new device-related information. This aspect has been described in later with reference to FIG. 4 in the present disclosure.

In an embodiment, the mapping module 232 includes suitable logic and/or interfaces for mapping, by a rule-based model 220, the authentication information on the template. Returning to the first non-limiting scenario, for mapping the authentication information on the template, the mapping module 232 is configured to extract one or more authentication parameters from the authentication information. Herein, the authentication information is received by the payment gateway from the first FIDO service provider. Then, the mapping module 232 is configured to assign, by the rule-based model 220, at least one of the one or more authentication parameters to the template. It is noted that if the template includes at least one mandatory field that cannot be assigned an authentication parameter from the one or more authentication parameters, the mapping module 232 is configured to utilize the fallback module 234 to perform a set of fallback operations specific for the first non-limiting scenario.

Returning to the second non-limiting scenario, for mapping the authentication information on the template, the mapping module 232 is configured to extract one or more authentication parameters from the authentication information. Herein, the authentication information is received by the payment gateway from the first FIDO service provider 114. Then, the mapping module 232 is configured to access a user device-specific template from the database. Herein, the user device-specific template includes one or more fields. Then, the mapping module 232 is configured to assign, by the rule-based model 220, at least one of the one or more authentication parameters and at least one of the one or more fields on the template. Herein, the template is a new user device-specific template. Further, the mapping module 232 is configured to transmit the new user device-specific template to the new user device. It is noted that if the template includes at least one mandatory field that cannot be assigned an authentication parameter from the one or more authentication parameters, the mapping module 232 is configured to utilize the fallback module 234 to perform a set of fallback operations specific for the second non-limiting scenario.

Further, the mapping module 232 is configured to transmit a FIDO authentication request message including the template to the second FIDO service provider 116. In response to receiving the authentication request message, the second FIDO service provider 116 is configured to authenticate the user 104 using the template. Upon successful authentication, the second FIDO service provider 116 is configured to transmit a FIDO authentication response message including an authentication successful flag to the mapping module 232. Alternatively, if the authentication is unsuccessful, the second FIDO service provider 116 is configured to transmit a FIDO authentication response message including an authentication unsuccessful flag to the mapping module 232.

In response to receiving the authentication successful flag, the mapping module 232 is configured to transmit an authentication successful message to the payment gateway. Alternatively, in response to receiving the authentication unsuccessful flag, the mapping module 232 is configured to transmit an authentication unsuccessful message to the payment gateway.

In an embodiment, the fallback module 234 includes suitable logic and/or interfaces for performing a set of fallback operations for the first non-limiting scenario and the second non-limiting scenario.

For the first non-limiting scenario, the set of fallback operations includes determining if a historically successful authentication with the authentication parameter has been performed by the user on the user device within a predefined time interval. Herein, the predefined time interval may be defined by an administrator (not shown) of the server system 200. Examples of the predefined time interval include 24 hours, 36 hours, 48 hours, and so on. In particular, the fallback module 234 may utilize the historical authentication data 218 including information related to a plurality of historical authentications performed by a plurality of users to determine if successful authentication has been performed within the predefined time interval or not. Then, the set of fallback operations includes upon determining that the historically successful authentication has been performed, assigning the authentication parameter received during the historically successful authentication to a corresponding mandatory field from at least one mandatory field. Herein, the steps of determining and assigning the authentication parameter may be repeated for each of the remaining mandatory fields in the at least one mandatory field.

Alternatively, upon determining that the historically successful authentication has not been performed, the set of fallback operations includes facilitating an alternative authentication process for the user on the user device based, at least in part, on the at least one mandatory field. In response to the completion of the alternative authentication process by the user, the set of operations includes receiving alternative authentication information from the user device 106. Herein, the alternative authentication information includes at least one authentication parameter. Then, the set of fallback operations includes assigning the at least one authentication parameter to the corresponding at least one mandatory field based, at least in part, on the alternative authentication information. This aspect has been described in later with reference to FIG. 3 in the present disclosure.

For the second non-limiting scenario, the set of fallback operations includes determining if a historically successful authentication with the authentication parameter has been performed by the user on the user device within a predefined time interval. Herein, the predefined time interval may be defined by an administrator (not shown) of the server system 200. Examples of the predefined time interval include 24 hours, 36 hours, 48 hours, and so on. In particular, the fallback module 234 may utilize the historical authentication data 218 including information related to a plurality of historical authentications performed by a plurality of users to determine if successful authentication has been performed within the predefined time interval or not. Then, the set of fallback operations includes upon determining that the historically successful authentication has been performed, assigning the authentication parameter received during the historically successful authentication to a corresponding mandatory field from the at least one mandatory field. Herein, the steps of determining and assigning the authentication parameter may be repeated for each of the remaining mandatory fields in the at least one mandatory field.

Alternatively, upon determining that the historically successful authentication has not been performed, the set of fallback operations includes facilitating an alternative authentication process for the user on the new user device based, at least in part, on the at least one mandatory field. In response to the completion of the alternative authentication process by the user, the set of operations includes receiving alternative authentication information from the new user device. Herein, the alternative authentication information includes at least one authentication parameter. Then, the set of fallback operations includes assigning the at least one authentication parameter to the corresponding at least one mandatory field based, at least in part, on the alternative authentication information. This aspect has been described in later with reference to FIG. 4 in the present disclosure.

Figure 3:
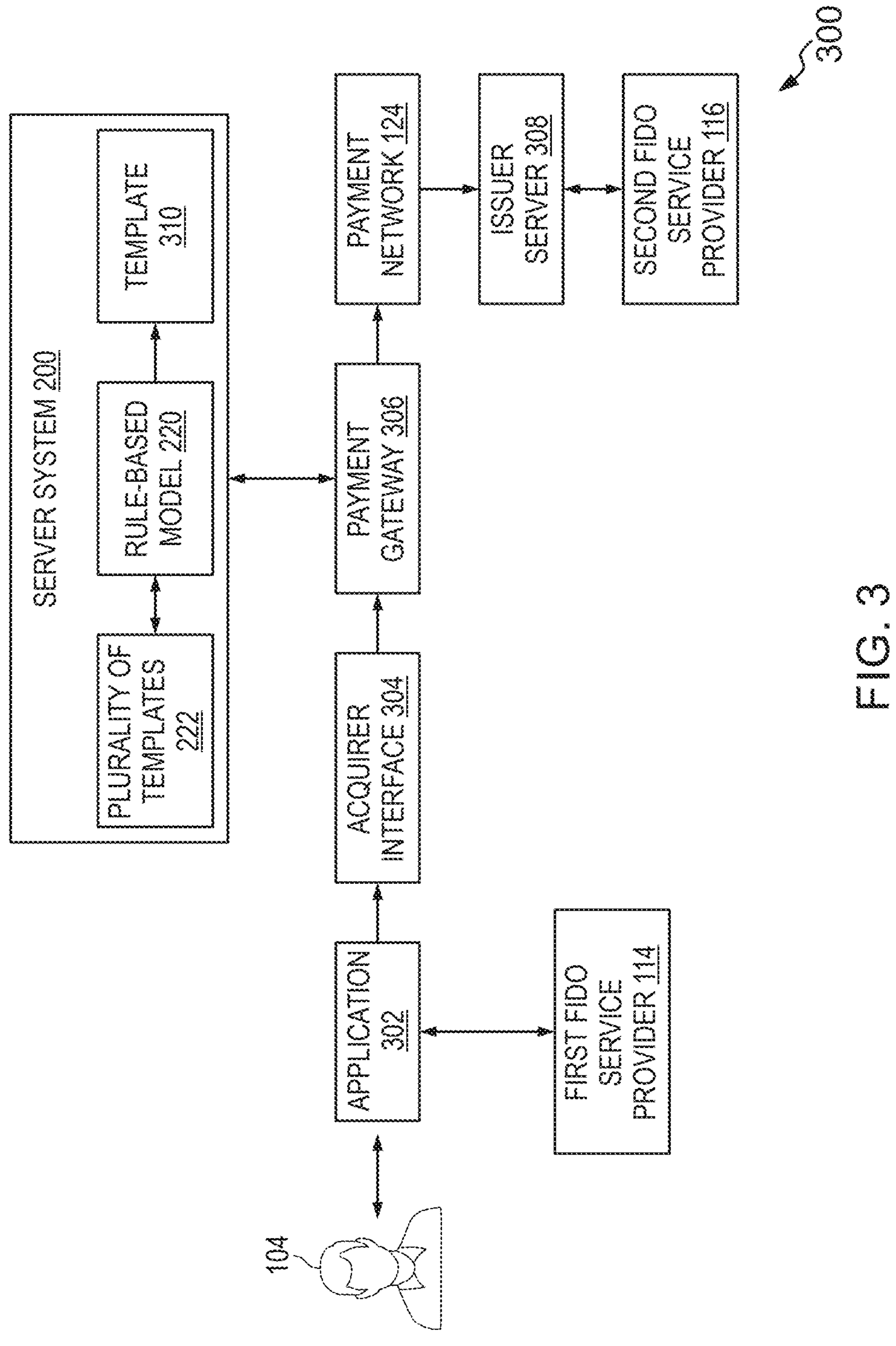
FIG. 3 illustrates an architecture for enabling interoperability between a first FIDO service provider associated with an aggregator application and a second FIDO service provider associated with a payment gateway of a merchant, in accordance with an embodiment of the present disclosure.

FIG. 3 illustrates an architecture 300 for enabling interoperability between a first FIDO service provider (such as first FIDO service provider 114) associated with an aggregator application (referred hereinafter as application 302) and a second FIDO service provider (such as second FIDO service provider 116) associated with a payment gateway 306 of a merchant (such as merchant 108), in accordance with an embodiment of the present disclosure.

In a non-limiting scenario, when a user such as user 104 wishes to perform a payment transaction using a payment card associated with the user 104, the user 104 may install an aggregator application (shown as application 302) on their user device 106. In an instance, the application 302 may be pre-installed on the user device 106 as well. During the setup of the application 302, the user 104 can opt for a FIDO authentication service offered by the first FIDO service provider 114 associated with the application 302. Setting up the FIDO authentication service involves a user enrollment process.

During the user enrollment process, the first FIDO service provider 114 may prompt the user 104 to use an FIDO authenticator with the capability to record authentication information using the user device 106. Herein, the term 'FIDO authenticator' refers to either a device (such as an external device capable of collecting information), software, or a set of instructions that is capable of generating and storing a private key. The private key is often stored in the secure element of the user device 106. In some instances, the first FIDO service provider 114 may facilitate the application 302 to act as the FIDO authenticator. Examples of FIDO authenticators include, but are not limited to, a hardware security key, a smartphone with biometric capabilities, a computing device with built-in FIDO support, and so on. In other words, the user 104 can provide their biometric information to the FIDO authenticator as one or more authentication parameters of the authenticator information. Examples of biometric data (i.e., an example of an authentication parameter) include, but are not limited to, fingerprint data, facial recognition data, iris scan data, and so on. The FIDO authenticator of the application 302, then processes the authentication information into a secure template. This secure template is stored securely stored on the secure element of the user device 106 by the application 302. In some instances, the authentication information may be represented by one or more authentication parameters within the secure template.

Additionally, the FIDO authenticator of the application 302 generates a unique key pair including a public key and a private key. The private key is stored in the secure element of the user device 106. Further, the public key is shared with the first FIDO service provider 114 along with a user profile of the user 104. Upon receiving the public key and the user profile, the first FIDO service provider 114, registers the user 104.

Now, whenever the user 104 logs on or performs a transaction on the application 302, the user 104 may be prompted to perform a FIDO authentication process. During the authentication process, the first FIDO service provider 114 generates and transmits a challenge (such as a randomly generated string) to the user device 106. Upon receiving the challenge, the user 104 is prompted to share the authentication information such as by performing a biometric authentication. For instance, the user device 106 may record an input including the biometric information (such as a finger print) from the user 104 and the application 302 is configured to compare the input with the stored biometric data in the secure template. If the comparison is successful, the application 302 signs the received challenge with the private key to generate a signed challenge. Otherwise, if the comparison is unsuccessful the application 302 may ask the user 104 to provide their biometric information again or fail the authentication process. Upon successful authentication, the user 104 may be granted access to the application 302 or a transaction may be authenticated for the user 104.

In case of successful comparison, the generated signed challenge is shared or transmitted back to the first FIDO service provider 114. Upon receiving the signed challenge, the first FIDO service provider 114 utilizes the public key to verify the signature of the user 104. If the verification is successful, the user 104 is authenticated. Otherwise if the verification fails, the authentication process is terminated. As described earlier, different FIDO service providers operate using different FIDO protocols such as Universal Second Factor (U2F), Universal Authentication Framework (UAF), FIDO2, and so on. Each of these FIDO protocols has its respective security templates. For example, the U2F protocol requires a second factor in addition to an existing password while the UAF protocol aims to eliminate passwords using biometric or a PIN.

Now, in the case of aggregator applications such as application 302, the user 104 can opt to purchase or pay for a product or service from a plurality of merchants on the application 302. For example, if the user 104 chooses to pay a bill for merchant 108, the application 302 may redirect the user 104 to an acquirer interface 304 of the merchant 108. The acquirer interface 304 refers to an interface that integrates or provides an interface for the acquirer server 112 of the merchant 108 to interact with the first FIDO service provider 114 for authentication of the user 104. In other words, the user authentication request for authenticating the user 104 from the merchant 108 is re-directed by the acquirer interface 304 to a FIDO service provider. As may be appreciated, the acquirer interface 304 may utilize a payment gateway 306 associated with a second FIDO service provider 116 to authenticate the user 104. In other words, the payment gateway 306 associated with the merchant 108 redirects the user authentication request to the second FIDO service provider 116. The user authentication request is sent over the payment network 124 to an issuer server 308 of an issuing bank associated with the payment card of the user 104. The second FIDO service provider 116 is configured to share the results of the authentication process with the issuer server 308. If the authentication process results in successful authentication, the user 104 is authenticated otherwise, the authentication of the user 104 fails.

However, as described earlier, a mismatch between the respective FIDO protocols followed by the first FIDO service provider 114 and the second FIDO service provider 116 leads to authentication failure. This occurs since the respective secure template of the first FIDO service provider 114 cannot be used to authenticate the user 104 due to an incompatibility with the respective secure template of the second FIDO service provider 116. For instance, the secure template of U2F requires a second factor along with a password while the secure template of UAF is password less with a biometric or PIN. Herein, the second factor refers to a U2F device (i.e., a physical hardware token) that has to be connected to the user device 106 in addition to the user password to authenticate the user 104.

In this scenario, the payment gateway 306 can transmit a mismatch resolution request including the authentication information to the server system 200. In response, the server system 200 is configured to determine at least one template associated with the second FIDO service provider 116 from a plurality of templates (such as the plurality of templates 222) using a rule-based model 220. Herein, the at least one template is compatible with the FIDO protocol of the second FIDO service provider 116. As described earlier, the rule-based model 220 may track the success rate of each template from the at least one template associated with the second FIDO service provider 116. The success rate as used herein describes a percentage of the total successful authentications performed using a respective template compared with the total number of authentication requests processed using the said respective template (i.e., a total of both the failed and successful authentications). The success rate may be computed periodically by the rule-based model 220. For example, the success rate of each template may be tracked daily, weekly, biweekly, monthly, or so on. The server system 200 is configured to select a template 310 with a highest success rate from the at least one template.

Upon selecting the template 310 with the highest success rate, the server system 200 is configured to map the authentication information from the mismatch resolution request on the selected template 310. In other words, one or more authentication parameters from the authentication information are assigned to the template 310. As described earlier, a template such as template 310 has a plurality of fields that have to be populated with one or more authentication parameters. In some instances, the fields can be populated or filled with a result of the comparison process as well. Herein, the results of the comparison process can be used as the one or more authentication parameters as well. For example, if a biometric comparison of the fingerprint of the user 104 with a stored fingerprint template is successful, then the authentication parameter for this process can be 'successful'. In other words, a field associated with the biometric comparison in the template 310 can be populated with successful as the authentication parameter.

In other words, the biometric-related field of the secure template (or the biometric-related authentication parameter) is mapped onto the biometric-related field of the template 310. Specifically, the template 310 will mark the biometric-related field as 'successful'. As may be understood, not all the fields may be common in between the secure template (or the one or more authentication parameters in the authentication information) may be common with the fields in the selected template 310. To that end, the server system 200 is configured to map only the required fields. In certain instances, the server system 200 may ignore non-mandatory fields in the template 310 as well to improve the speed of the mapping operation if it will not impact the success rate of the authentication process.

Then, the server system 200 transmits a FIDO authentication request message including the template 310 to the payment gateway 306. The payment gateway 306 is then configured to transmit the template 310 to the second FIDO service provider 116 via the payment network 124. As may be appreciated, since the template 310 is compatible with the FIDO protocol of the second FIDO service provider 116, it will be able to authenticate the user 104 using the template 310. Upon successful authentication, the second FIDO service provider 116 shares the results of the authentication process with the issuer server 308 to authenticate the user 104. Once, the user 104 is authenticated, the issuer server 308 may authorize the payment transaction in favor of the merchant 108 and settle the payment with the acquirer server 112 of the merchant 108.

It is noted while converting from one FIDO protocol to another FIDO protocol, the template 310 might have at least one mandatory field that has to be filled in the template 310 to ensure that authentication can be performed by the second FIDO service provider 116. However, if the one or more authentication parameters of the authentication information cannot be utilized by the server system 200 to fill the at least one mandatory field, then a set of fallback operations may be performed. For example, if the protocol of the second FIDO service provider 116 requires a PIN comparison successful flag as a mandatory field in the template 310, while no authentication parameter in the authentication information can satisfy this condition, then the fallback operations are performed to populate or map this field.

In a non-limiting example, the set of fallback operations may include determining if a historically successful authentication with an authentication parameter required to populate a mandatory has been performed by the user 104 on the user device 106 within a predefined time interval. In particular, historical authentication data 218 may be utilized by the server system 200 to perform the said determination. The predefined time interval may be defined by an administrator (not shown) of the server system 200. Examples of the predefined time interval include any past time interval from the time of the ongoing authentication process such as the past 2 hours, 6 hours, 12 hours, 24 hours, 48 hours, 72 hours, or so. Upon determining that the historically successful authentication has been performed, the authentication parameter received during the historically successful authentication can be assigned to a corresponding mandatory field from the at least one mandatory field. It is noted that these steps of determining and assigning the authentication parameter are repeated for each of the remaining mandatory fields in the at least one mandatory field. For example, if an authentication parameter indicating a PIN comparison successful flag is previously encountered by the server system 200 within the predefined time interval, then the said authentication parameter can be used to populate the required mandatory field.

In another non-limiting example, the set of fallback operations may include upon determining that the historically successful authentication has not been performed, facilitating an alternative authentication process for the user 104 on the user device 106 based, at least in part, on the at least one mandatory field. For instance, the user 104 may be prompted to provide a user Personal Identification Number (PIN) on the display of the user device 106. The user 104 may complete the alternative authentication process to share at least one authentication parameter to the server system 200. Upon receiving the at least one authentication parameter, the server system 200 is configured to assign the at least one authentication parameter to the corresponding at least one mandatory field. For example, if an authentication parameter indicating a PIN comparison successful flag has not been previously encountered by the server system 200 within the predefined time interval. Then, the said comparison can be performed using the alternative authentication process and the received authentication parameter including the successful flag can be used to populate the required mandatory field.

As may be appreciated, the fallback operations ensure that the authentication process does not fail due to missing parameters thus promoting a higher authentication rate for the ongoing authentication process. This aspect helps to save time for the user 104 while reducing the processing resources required to perform the back-and-forth communication between the different FIDO service providers due to failed authentication processes.

Figure 4:
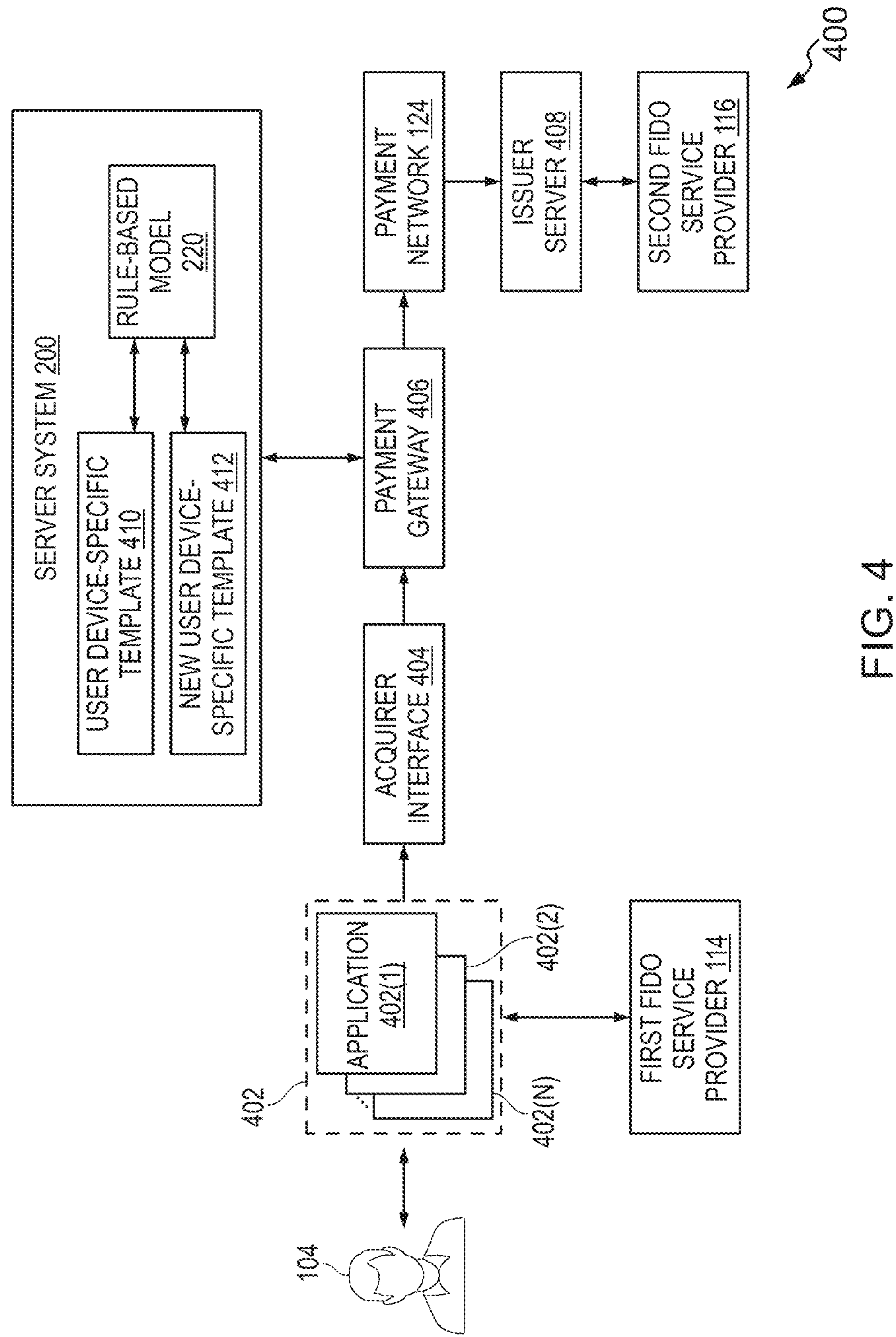
FIG. 4 illustrates an architecture for enabling interoperability between a first FIDO service provider associated with an application from a plurality of applications and a second FIDO service provider associated with a new user device, in accordance with an embodiment of the present disclosure.

FIG. 4 illustrates an architecture 400 for enabling interoperability between a first FIDO service provider (such as first FIDO service provider 114) associated with an application from a plurality of applications and a second FIDO service provider (such as second FIDO service provider 116) associated with a new user device, in accordance with an embodiment of the present disclosure. It is noted that the acquirer interface 404, payment gateway 406, and issuer server 408 have nearly identical operations as the acquirer interface 304, payment gateway 306, and issuer server 308 described with reference to FIG. 3 earlier. Therefore, an explanation for the same is not repeated for the sake of brevity.

In a non-limiting scenario, when a user such as user 104 wishes to perform a payment transaction using a payment card associated with the user 104, the user 104 may install an application (such as application 402(1)) on their user device 106. In an instance, the application 402(1) may be pre-installed on the user device 106 as well. Similarly, multiple applications such as the plurality of applications 402(1), 402(2), . . . , 402(N) (N being a non-zero natural number), referred hereinafter interchangeably as applications 402 may be installed on the user device 106 as well. The user 104 may set up the FIDO authentication service for each of these applications 402 using the process described with reference to FIG. 3. In this scenario, each application is associated with a corresponding merchant.

If the user 104 switches or upgrades to a new user device, the user 104 typically needs to re-register their new user device with each FIDO service provider associated with each of the applications 402. This involves logging into each FIDO service provider of each application with primary login details. Herein, primary login details refer to a username and password for the user profile of the user 104 associated with each application. This is a cumbersome process that if not performed will lead to authentication failure or leave redundant or useless entries in the databases of the different FIDO service providers of these applications. This redundancy can lead to an increase in storage costs and poor indexing for said FIDO service providers.

As may be understood, after switching the user device 106 with the new user device, the FIDO authenticator associated with the user device 106 (i.e., older device) and the FIDO authenticator new user device will become different. In other words, it can be said that the user device 106 has switched from a first FIDO service provider (such as first FIDO service provider 114) to a second FIDO service provider (such as second FIDO service provider 116).

Now, if the user 104 utilizes any of the applications 402 such as the application 402(1) to purchase or pay for a product or service from the merchant 108 on the application 402(1). For example, if the user 104 chooses to pay a bill for merchant 108, the application 402(1) may redirect the user 104 to an acquirer interface 404.

As described earlier, the acquirer interface 404 refers to an interface that integrates or provides an interface for the acquirer server 112 of the merchant 108 to interact with the first FIDO service provider 114 for authentication of the user 104. Since, the user 104 has switched to a new user device which is associated with a second FIDO service provider 116. Then, when a new transaction is performed, during the FIDO authentication, the payment gateway 406 will detect a mismatch between the respective FIDO protocols followed by the first FIDO service provider 114 and the second FIDO service provider 116.

In this scenario, the payment gateway 406 can transmit the mismatch resolution request including the authentication information to the server system 200. In response, the server system 200 is configured to access new device-related information from a new user device of the user 104. Then, select a new user device-specific template 412 associated with the new user device from the database based, at least in part, on the new device-related information. It is noted that a new user device-specific template 412 will be linked to the user 104. In other words, the said template is specific to the user 104. In an instance, the said new user device-specific template 412 may be generated after the user 104 subscribes to a service to prevent protocol mismatch due to device upgrades offered by the payment gateway 406 or the payment processor. In such a scenario, once the user 104 subscribes to this service, the user device-specific template 410 for the old user device (i.e., user device 106) may be shared and stored with the server system 200.

Upon selecting the new user device-specific template 412, the server system 200 is configured to utilize the rule-based model 220 to map the one or more authentication parameters present in the authentication information and one or more fields of the user device-specific template 410 onto the new user device-specific template 412. Further, if there exists at least one mandatory field in the new user device-specific template 412 that cannot be populated by the one or more authentication parameters and the one or more fields, the set of fallback operations described in reference with FIG. 3 are performed. These operations are not described again for the sake of brevity. Further, the server system 200 is configured to transmit the new user device-specific template 412 to the new user device. In an example, an API message may be used to transmit the new user device-specific template 412 to the new user device. Upon receiving the said new user device-specific template 412, the new user device can automatically update the secure element to update the FIDO authenticator for all applications 402. This aspect enables the server system 200 to update the FIDO information, without the need to perform the re-registration process for all applications 402.

It is noted that the ongoing transaction may be processed according to the explanation provided in reference to FIG. 3, therefore the same is not explained again for the sake of brevity.

Figure 5:
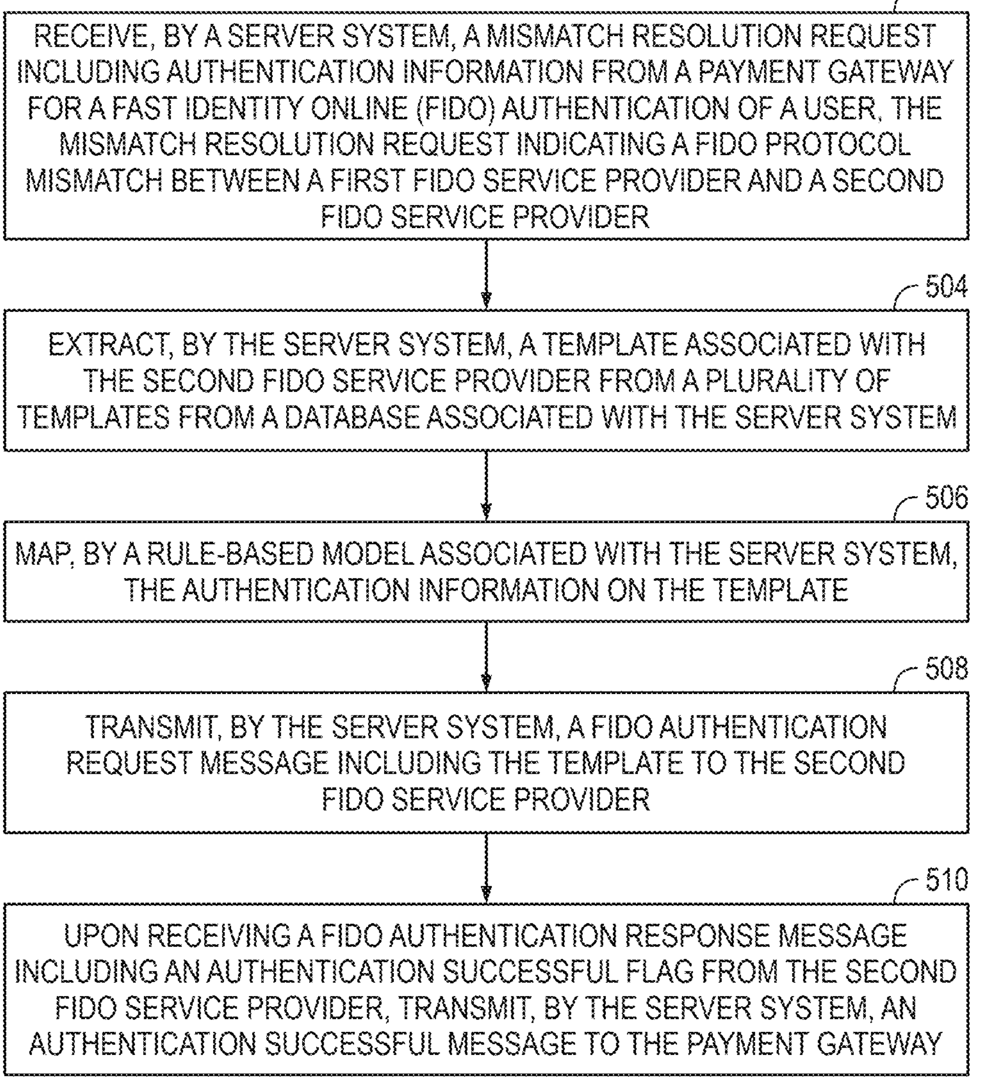
FIG. 5 illustrates a process flow diagram depicting a method for enabling interoperability between a first FIDO service provider and a second FIDO service provider, in accordance with an embodiment of the present disclosure.

FIG. 5 illustrates a process flow diagram depicting a method 500 for enabling interoperability between a first FIDO service provider and a second FIDO service provider, in accordance with an embodiment of the present disclosure. The method 500 depicted in the flow diagram may be executed by, for example, the server system 200. The sequence of operations of the method 500 may not be necessarily executed in the same order as they are presented. Further, one or more operations may be grouped and performed in the form of a single step, or one operation may have several sub-steps that may be performed in parallel or in a sequential manner. Operations of the method 500, and combinations of operations in the method 500 may be implemented by, for example, hardware, firmware, a processor, circuitry, and/or a different device associated with the execution of software that includes one or more computer program instructions. The plurality of operations is depicted in the process flow of the method 500. The process flow starts at operation 502.

At 502, the method 500 includes receiving, by a server system such as server system 200, a mismatch resolution request including authentication information from a payment gateway such as the payment gateway 306 for a Fast Identity Online (FIDO) authentication of a user such as user 104. The mismatch resolution request may indicate a FIDO protocol mismatch between a first FIDO service provider such as the first FIDO service provider 114 and a second FIDO service provider such as the second FIDO service provider 116. In one example, the first FIDO service provider 114 is associated with at least one application installed on a user device such as user device 106 associated with the user 104, and the second FIDO service provider 116 is associated with the payment gateway 306.

At 504, the method 500 includes extracting, the server system 200, a template such as template 310 associated with the second FIDO service provider 116 from a plurality of templates such as the plurality of templates 222 from a database such as database 204 associated with the server system 200.

At 506, the method 500 includes mapping, by a rule-based model such as the rule-based model 220 associated with the server system 200, the authentication information on the template.

At 508, the method 500 includes transmitting, by the server system 200, a FIDO authentication request message including the template 310 to the second FIDO service provider 116.

At 510, the method 500 includes upon receiving a FIDO authentication response message including an authentication successful flag from the second FIDO service provider 116, transmitting, by the server system 200, an authentication successful message to the payment gateway 306.

FIG. 6 illustrates a process flow diagram depicting a method 600 for enabling interoperability between a first FIDO service provider associated with an aggregator application and a second FIDO service provider associated with a merchant such as merchant 108, in accordance with an embodiment of the present disclosure. The method 600 depicted in the flow diagram may be executed by, for example, the server system 200. The sequence of operations of the method 600 may not be necessarily executed in the same order as they are presented. Further, one or more operations may be grouped and performed in the form of a single step, or one operation may have several sub-steps that may be performed in parallel or in a sequential manner. Operations of the method 600, and combinations of operations in the method 600 may be implemented by, for example, hardware, firmware, a processor, circuitry, and/or a different device associated with the execution of software that includes one or more computer program instructions. The plurality of operations is depicted in the process flow of the method 600. The process flow starts at operation 602.

At 602, the method 600 includes receiving, by a server system such as server system 200, a mismatch resolution request including authentication information from a payment gateway such as the payment gateway 306 for a Fast Identity Online (FIDO) authentication of a user such as user 104. The mismatch resolution request may indicate a FIDO protocol mismatch between a first FIDO service provider such as the first FIDO service provider 114 and a second FIDO service provider such as the second FIDO service provider 116. Herein, the first FIDO service provider 114 is associated with an aggregator application installed on a user device such as user device 106 associated with the user 104 and the second FIDO service provider 116 is associated with the payment gateway 306 of a merchant such as merchant 108 associated with the aggregator application such as application 302.

At 604, the method 600 includes extracting, the server system 200, a template associated with the second FIDO service provider 116 from a plurality of templates such as the plurality of templates 222 from a database such as database 204 associated with the server system 200.

At 606, the method 600 includes mapping, by a rule-based model such as the rule-based model 220 associated with the server system 200, the authentication information on the template.

At 608, the method 600 includes transmitting, by the server system 200, a FIDO authentication request message including the template 310 to the second FIDO service provider 116.

At 610, the method 600 includes upon receiving a FIDO authentication response message including an authentication successful flag from the second FIDO service provider 116, transmitting, by the server system 200, an authentication successful message to an acquirer server such as acquirer server 112 associated with the merchant 108 using the payment gateway 306.

FIG. 7 illustrates a process flow diagram depicting a method 700 for enabling interoperability between a first FIDO service provider associated with a user device such as user device 106 and a second FIDO service provider associated with a new user device, in accordance with an embodiment of the present disclosure. The method 700 depicted in the flow diagram may be executed by, for example, the server system 200. The sequence of operations of the method 700 may not be necessarily executed in the same order as they are presented. Further, one or more operations may be grouped and performed in the form of a single step, or one operation may have several sub-steps that may be performed in parallel or in a sequential manner. Operations of the method 700, and combinations of operations in the method 700 may be implemented by, for example, hardware, firmware, a processor, circuitry, and/or a different device associated with the execution of software that includes one or more computer program instructions. The plurality of operations is depicted in the process flow of the method 700. The process flow starts at operation 702.

At 702, the method 700 includes receiving, by a server system such as server system 200, a mismatch resolution request including authentication information from a payment gateway such as the payment gateway 306 for a Fast Identity Online (FIDO) authentication of a user such as user 104. The mismatch resolution request may indicate a FIDO protocol mismatch between a first FIDO service provider such as the first FIDO service provider 114 and a second FIDO service provider such as the second FIDO service provider 116. Herein, the first FIDO service provider 114 is associated with at least one application installed on a user device 106 associated with the user 104 and the second FIDO service provider 116 is associated with a new user device.

At 704, the method 700 includes extracting, the server system 200, a new user device-specific template associated with the second FIDO service provider 116 from a plurality of templates such as the plurality of templates 222 from a database such as database 204 associated with the server system 200.

At 706, the method 700 includes mapping, by a rule-based model such as the rule-based model 220 associated with the server system 200, the authentication information on the template.

At 708, the method 700 includes transmitting, by the server system 200, a FIDO authentication request message including the new user device-specific template to the second FIDO service provider 116.

At 710, the method 700 includes updating, by the server system 200, a user-device-specific template with the new user device-specific template on the new user device.

Figure 8:
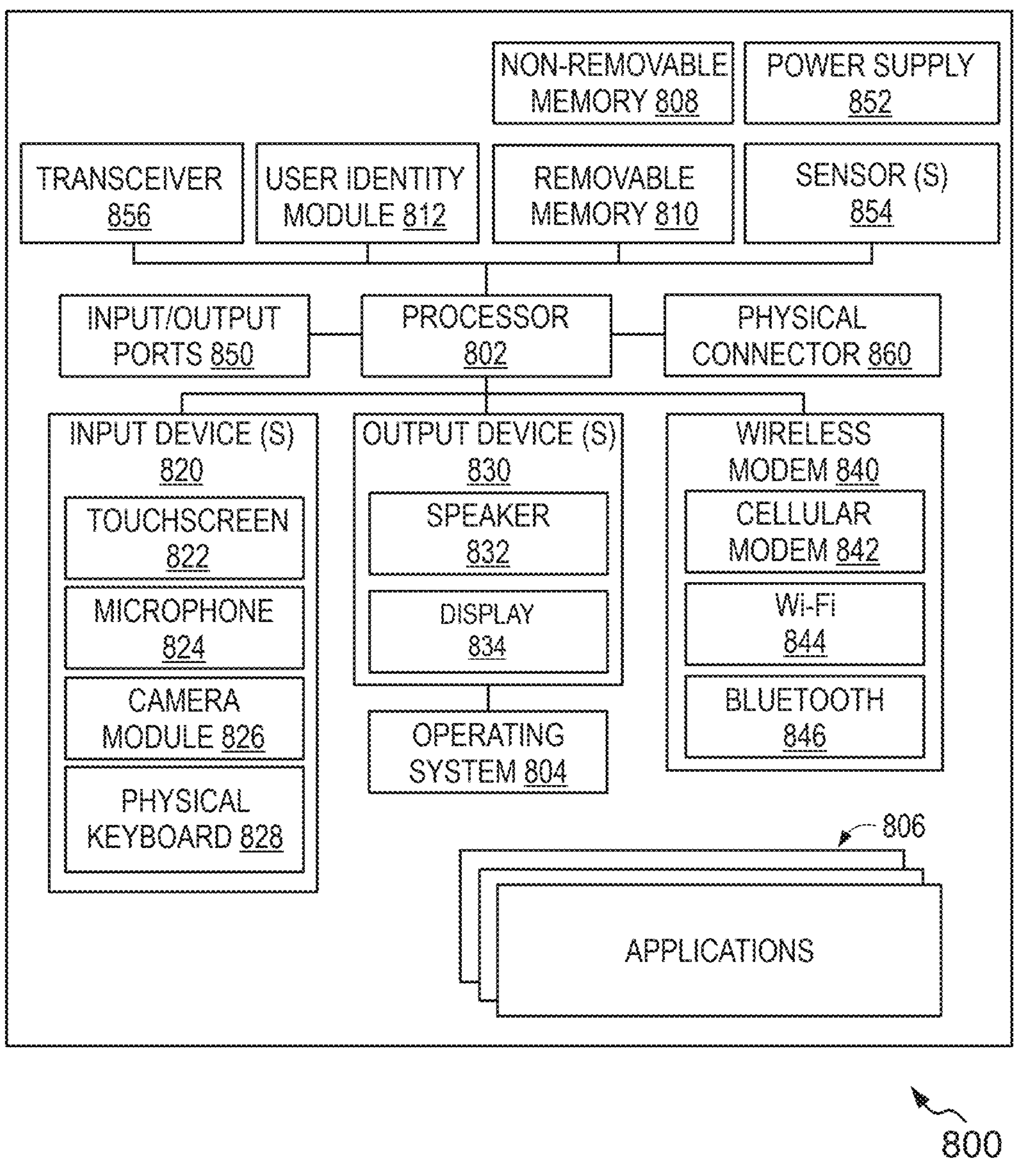
FIG. 8 shows a simplified block diagram of a user device capable of implementing the various embodiments of the present disclosure.

FIG. 8 shows a simplified block diagram of a user device 800 capable of implementing the various embodiments of the present disclosure. The user device 800 may be an example of the user device 106 shown in FIG. 1. It should be understood that the user device 800 as illustrated and hereinafter described is merely illustrative of one type of device and should not be taken to limit the scope of the embodiments. As such, it should be appreciated that at least some of the components described below in connection with the user device 800 may be optional and thus in an example embodiment may include more, less, or different components than those described in connection with the example embodiment of the FIG. 8. As such, among other examples, the user device 800 could be any of an user device or may be embodied in any of the user devices, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 800 includes a controller or a processor 802 (e.g., a signal processor, microprocessor, ASIC, or other control and processing logic circuitry) for performing such tasks as signal coding, data processing, image processing, input/output processing, power control, and/or other functions. An operating system 804 controls the allocation and usage of the components of the user device 800 and provides support for one or more programs such as a location tracking application that implements one or more of the innovative features described herein. The applications 806 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 800 includes one or more memory components, for example, a non-removable memory 808 and/or a removable memory 810. The non-removable memory 808 and/or the removable memory 810 may be collectively known as storage device/module in an embodiment. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804. The user device 800 may further include a user identity module (UIM) 812. The UIM 812 may be a memory device having a processor 802 built in. The UIM 812 may include, for example, a subscriber identity module (SIM), a universal integrated circuit card (UICC), a universal subscriber identity module (USIM), a removable user identity module (R-UIM), or any other smart card. The UIM 812 typically stores information elements related to a mobile subscriber. The UIM 812 in the form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA8000, wideband CDMA (WCDMA) and time division-synchronous CDMA (TD-SCDMA), or with fourth-generation (4G) wireless communication protocols such as LTE (Long-Term Evolution).

The user device 800 can support one or more input devices 820 and one or more output devices 830. Examples of the input devices 820 may include, but are not limited to, a touch screen/a display screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video images) and a physical keyboard 828. Examples of the output devices 830 may include, but are not limited to, a speaker 832 and a display 834. Other possible output devices 830 can include piezoelectric or other haptic output devices. Some devices can serve more than one input/output function. For example, the touch screen 822 and the display 834 can be combined into a single input/output device.

A wireless modem 840 can be coupled to one or more antennas (not shown in the FIG. 8) and can support two-way communications between the processor 802 and external devices, as is well understood in the art. The wireless modem 840 is shown generically and can include, for example, a cellular modem 842 for communicating at long range with the mobile communication network, a Wi-Fi compatible modem (shown as Wi-Fi 844) for communicating at short range with an external Bluetooth-equipped device, or a local wireless data network or router, and/or a Bluetooth-compatible modem (shown as Bluetooth 846). The wireless modem 840 is typically configured for communication with one or more cellular networks, such as a GSM network for data and voice communications within a single cellular network, between cellular networks, or between the user device 800 and a public switched telephone network (PSTN).

The user device 800 can further include one or more input/output ports 850, a power supply 852, one or more sensors 854 for example, a fingerprint sensor, a heartbeat sensor, a face scanning sensor, the microphone 824, an accelerometer, a gyroscope, a compass, a global positioning system sensor (for providing location details) or an infrared proximity sensor for detecting the orientation or motion of the user device 800, a transceiver 856 (for wirelessly transmitting analog or digital signals) and/or a physical connector 860, which can be a USB port, IEEE 1284 (FireWire) port, and/or RS-232 port. The illustrated components are not required or all-inclusive, as any of the components shown can be deleted and other components can be added.

The disclosed method with reference to FIGS. 5 to 7, or one or more operations of the server system 200 may be implemented using software including computer-executable instructions stored on one or more computer-readable media (e.g., non-transitory computer-readable media, such as one or more optical media discs, volatile memory components (e.g., Dynamic Random Access Memory (DRAM) or Static Random Access Memory (SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means include, for example, the Internet, the World Wide Web (WWW), an intranet, software applications, cable (including fiber optic cable), magnetic communications, electromagnetic communications (including Radio Frequency (RF), microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, Complementary Metal Oxide Semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, Application Specific Integrated Circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor 802 or the computer to perform one or more operations. A computer-readable medium storing, embodying, or encoded with a computer program, or similar language, may be embodied as a tangible data storage device storing one or more software programs that are configured to cause a processor 802 or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media. Examples of non-transitory computer-readable media include magnetic storage media (such as floppy disks, magnetic tapes, hard disk drives, etc.), optical magnetic storage media (e.g. magneto-optical disks), Compact Disc Read-Only Memory (CD-ROM), Compact Disc Recordable (CD-R), Compact Disc Rewritable (CD-R/W), Digital Versatile Disc (DVD), BD (BLU-RAY® Disc), and semiconductor memories (such as mask ROM, PROM (programmable ROM), EPROM (erasable PROM), flash memory, Random Access Memory (RAM), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented, Fast Identity Online (FIDO) authentication mismatch resolution method comprising:

receiving, by a server system and from a payment gateway, a mismatch resolution request comprising authentication information for the FIDO authentication of a user, the mismatch resolution request indicating a FIDO protocol mismatch between a first FIDO service provider operating using a first FIDO protocol and a second FIDO service provider operating using a second, mutually incompatible FIDO protocol; and using a database associated with the server system to resolve the FIDO protocol mismatch between the first FIDO service provider and the second FIDO service provider, the database associated with the server system having stored therein:

FIDO-related information for a plurality of FIDO service providers including at least the first FIDO service provider and the second FIDO service provider; and a plurality of templates generated based on the FIDO-related information, wherein using the database associated with the server system to resolve the FIDO protocol mismatch between the first FIDO service provider and the second FIDO service provider comprises:

extracting, by the server system and from the database associated with the server system, a template associated with the second FIDO service provider from the plurality of templates;

mapping, by a rule-based model associated with the server system, the authentication information on the template, wherein the mapping by the rule-based model comprises:

extracting one or more authentication parameters from the authentication information:

assigning at least one authentication parameter to at least one corresponding field on the template based on predefined mapping rules; and responsive to a mandatory field on the template lacking an assignable authentication parameter, performing a fallback operation comprising determining whether a historically successful authentication has occurred within a predefined time interval and assigning an authentication parameter obtained during the historically successful authentication when the historically successful authentication is determined to have occurred;

transmitting, by the server system, a FIDO authentication request message comprising the template to the second FIDO service provider; and upon receiving, from the second FIDO service provider, an authentication successful flag in a FIDO authentication response message, transmitting, by the server system, an authentication successful message to the payment gateway.

2. The computer-implemented, FIDO authentication mismatch resolution method as claimed in claim 1, further comprising:

upon receiving, from the second FIDO service provider, an authentication unsuccessful flag in the FIDO authentication response message, transmitting, by the server system, an authentication unsuccessful message to the payment gateway.

3. The computer-implemented, FIDO authentication mismatch resolution method as claimed in claim 1, further comprising:

accessing, by the server system, corresponding FIDO-related information from each FIDO service provider of a plurality of FIDO service providers, wherein the plurality of FIDO service providers comprises at least the first FIDO service provider and the second FIDO service provider; and generating, by the rule-based model, the plurality of templates for the plurality of FIDO service providers based, at least in part, on the corresponding FIDO-related information, wherein each FIDO service provider is associated with at least one template from the plurality of templates.

4. The computer-implemented, FIDO authentication mismatch resolution method as claimed in claim 1, wherein extracting the template associated with the second FIDO service provider comprises:

determining, by the server system and from the plurality of templates stored in the database associated with the server system, at least one template associated with the second FIDO service provider; and selecting, by the server system and using a rule-based model configured to track, based on the FIDO authentication response message received for each FIDO authentication performed for a plurality of users, historical success rates of the plurality of templates stored in the database associated with the server system, the template from the at least one template based, at least on, the template being associated with a highest success rate for the second FIDO service provider.

5. The computer-implemented, FIDO authentication mismatch resolution method as claimed in claim 1, wherein mapping the authentication information on the template comprises:

extracting, by the server system, one or more extracted authentication parameters from the authentication information, wherein the authentication information is received by the payment gateway from the first FIDO service provider; and assigning, by the server system, at least one of the one or more extracted authentication parameters to the template, wherein upon detecting that the template comprises at least one mandatory field that cannot be assigned an authentication parameter from the one or more extracted authentication parameters, the server system is configured to perform a set of fallback operations.

6. The computer-implemented, FIDO authentication mismatch resolution method as claimed in claim 5, wherein the set of fallback operations comprises:

determining, by the server system, whether a historically successful authentication with the authentication parameter from the one or more extracted authentication parameters has been performed by the user on a user device within a predefined time interval; and upon determining that the historically successful authentication has been performed, assigning, by the server system, the authentication parameter received during the historically successful authentication to a corresponding mandatory field from the at least one mandatory field, wherein the steps of determining and assigning the authentication parameter are repeated for each remaining mandatory field in the at least one mandatory field.

7. The computer-implemented, FIDO authentication mismatch resolution method as claimed in claim 6, wherein the set of fallback operations further comprises:

upon determining that the historically successful authentication has not been performed, facilitating, by the server system, an alternative authentication process for the user on the user device based, at least in part, on the at least one mandatory field;

in response to completion of the alternative authentication process by the user, receiving, by the server system, alternative authentication information from the user device, the alternative authentication information comprising one or more alternative authentication parameters; and assigning, by the rule-based model, at least one of the one or more alternative authentication parameters to the template, wherein upon detecting that the template comprises at least one mandatory field that cannot be assigned any alternative authentication parameter from the one or more alternative authentication parameters, the server system is configured to perform another set of fallback operations.

8. The computer-implemented, FIDO authentication mismatch resolution method as claimed in claim 1, wherein extracting the template associated with the second FIDO service provider comprises:

accessing, by the server system, new device-related information from a new user device of the user; and selecting, by the server system, a new user device-specific template associated with the new user device from the database associated with the server system as the template based, at least in part, on the new device-related information.

9. The computer-implemented, FIDO authentication mismatch resolution method as claimed in claim 1, wherein mapping the authentication information on the template comprises:

extracting, by the server system, one or more extracted authentication parameters from the authentication information, wherein the authentication information is received by the payment gateway from the first FIDO service provider;

accessing, by the server system, a user device-specific template from the database associated with the server system, the user device-specific template comprising one or more fields;

assigning, by the rule-based model, at least one of the one or more extracted authentication parameters and at least one of the one or more fields on the template, wherein the template is a new user device-specific template;

transmitting, by the server system, the new user device-specific template to a new user device; and wherein upon detecting that the template comprises at least one mandatory field that cannot be assigned an authentication parameter from the one or more extracted authentication parameters, the server system is configured to perform a set of fallback operations comprising:

determining whether a historically successful authentication with the authentication parameter from the one or more extracted authentication parameters has been performed by the user on the new user device within a predefined time interval; and upon determining that the historically successful authentication has been performed, assigning the authentication parameter received during the historically successful authentication to a corresponding mandatory field from the at least one mandatory field, wherein the steps of determining and assigning the authentication parameter are repeated for each remaining mandatory field in the at least one mandatory field.

10. The computer-implemented, FIDO authentication mismatch resolution method as claimed in claim 9, wherein the set of fallback operations further comprises:

upon determining that the historically successful authentication has not been performed, facilitating an alternative authentication process for the user on the new user device based, at least in part, on the at least one mandatory field;

in response to completion of the alternative authentication process by the user receiving, by the server system, alternative authentication information from the new user device, the alternative authentication information comprising at least one authentication parameter; and assigning the at least one authentication parameter to the corresponding mandatory field from the at least one mandatory field based, at least in part, on the alternative authentication information.

11. The computer-implemented, FIDO authentication mismatch resolution method as claimed in claim 1, wherein the server system is a payment server associated with the payment gateway.

12. A computer-implemented, Fast Identity Online (FIDO) authentication mismatch resolution method comprising:

receiving, by a server system and from a payment gateway, a mismatch resolution request comprising authentication information for the FIDO authentication of a user, the mismatch resolution request indicating a FIDO protocol mismatch between a first FIDO service provider operating using a first FIDO protocol and a second FIDO service provider operating using a second, mutually incompatible FIDO protocol, wherein the first FIDO service provider is associated with an aggregator application installed on a user device associated with the user and the second FIDO service provider is associated with the payment gateway of a merchant associated with the aggregator application;

extracting, by the server system, a template associated with the second FIDO service provider from a plurality of templates from a database associated with the server system;

mapping, by a rule-based model associated with the server system, the authentication information on the template, wherein the mapping by the rule-based model comprises:

extracting one or more authentication parameters from the authentication information;

assigning at least one authentication parameter to at least one corresponding field on the template based on predefined mapping rules; and responsive to a mandatory field on the template lacking an assignable authentication parameter, performing a fallback operation comprising determining whether a historically successful authentication has occurred within a predefined time interval and assigning an authentication parameter obtained during the historically successful authentication when the historically successful authentication is determined to have occurred;

transmitting, by the server system, a FIDO authentication request message comprising the template to the second FIDO service provider; and upon receiving a FIDO authentication response message comprising an authentication successful flag from the second FIDO service provider, transmitting, by the server system, an authentication successful message to an acquirer server associated with the merchant using the payment gateway.

13. A computer-implemented, Fast Identity Online (FIDO) authentication mismatch resolution method comprising:

receiving, by a server system and from a payment gateway, a mismatch resolution request comprising authentication information the FIDO authentication of a user, the mismatch resolution request indicating a FIDO protocol mismatch between a first FIDO service provider operating using a first FIDO protocol and a second FIDO service provider operating using a second, mutually incompatible FIDO protocol, wherein the first FIDO service provider is associated with at least one application installed on a user device associated with the user and the second FIDO service provider is associated with a new user device;

extracting, by the server system, a new user device-specific template associated with the second FIDO service provider from a database associated with the server system;

mapping, by a rule-based model associated with the server system, the authentication information on the new user device-specific template, wherein the mapping by the rule-based model comprises:

extracting one or more authentication parameters from the authentication information;

assigning at least one authentication parameter to at least one corresponding field on the new user device-specific template based on predefined mapping rules; and responsive to a mandatory field on the new user device-specific template lacking an assignable authentication parameter, performing a fallback operation comprising determining whether a historically successful authentication has occurred within a predefined time interval and assigning an authentication parameter obtained during the historically successful authentication when the historically successful authentication is determined to have occurred;

transmitting, by the server system, a FIDO authentication request message comprising the new user device-specific template to the second FIDO service provider; and updating, by the server system, a user-device-specific template with the new user device-specific template on the new user device.

14. A Fast Identity Online (FIDO) authentication mismatch resolution server system, comprising:

a memory configured with instructions stored therein;

a communication interface; and a processor in communication with the memory and the communication interface, the processor configured to execute the instructions stored in the memory and thereby cause the FIDO authentication mismatch resolution server system to perform, at least:

receiving, from a payment gateway, a mismatch resolution request comprising authentication information for the FIDO authentication of a user, the mismatch resolution request indicating a FIDO protocol mismatch between a first FIDO service provider operating using a first FIDO protocol and a second FIDO service provider operating using a second, mutually incompatible FIDO protocol, wherein the first FIDO service provider is associated with at least one application installed on a user device associated with the user and the second FIDO service provider is associated with the payment gateway;

extracting a template associated with the second FIDO service provider from a plurality of templates from a database associated with the FIDO authentication mismatch resolution server system;

mapping, by a rule-based model associated with the FIDO authentication mismatch resolution server system, the authentication information on the template, wherein the mapping by the rule-based model comprises:

extracting one or more authentication parameters from the authentication information;

assigning at least one authentication parameter to at least one corresponding field on the template based on predefined mapping rules; and responsive to a mandatory field on the template lacking an assignable authentication parameter, performing a fallback operation comprising determining whether a historically successful authentication has occurred within a predefined time interval and assigning an authentication parameter obtained during the historically successful authentication when the historically successful authentication is determined to have occurred;

transmitting, by the FIDO authentication mismatch resolution server system, a FIDO authentication request message comprising the template to the second FIDO service provider; and upon receiving a FIDO authentication response message comprising an authentication successful flag from the second FIDO service provider, transmitting an authentication successful message to the payment gateway.

15. The FIDO authentication mismatch resolution server system as claimed in claim 14, wherein the FIDO authentication mismatch resolution server system is further caused, at least in part, to:

access corresponding FIDO-related information from each FIDO service provider of a plurality of FIDO service providers, wherein the plurality of FIDO service providers comprises at least the first FIDO service provider and the second FIDO service provider;

generate, by the rule-based model, the plurality of templates for the plurality of FIDO service providers based, at least in part, on the corresponding FIDO-related information, wherein each FIDO service provider is associated with at least one template from the plurality of templates; and track, by the rule-based model, a success rate of each template of at least one template associated with a corresponding FIDO service provider, wherein the success rate is tracked based, at least in part, on the FIDO authentication response message received for each FIDO authentication performed for a plurality of users.

16. The FIDO authentication mismatch resolution server system as claimed in claim 14, wherein extracting the template associated with the second FIDO service provider comprises the FIDO authentication mismatch resolution server system being further caused to:

determine at least one template associated with the second FIDO service provider from the plurality of templates; and select, using a rule-based model configured to track, based on the FIDO authentication response message received for each FIDO authentication performed for a plurality of users, historical success rates of the plurality of templates stored in the database associated with the FIDO authentication mismatch resolution server system, the template from the at least one template based, at least on, the template being associated with a highest success rate for the second FIDO service provider.

17. The FIDO authentication mismatch resolution server system as claimed in claim 14, wherein the fallback operation further comprises:

upon determining that the historically successful authentication has not been performed, performing an alternative authentication process for the user on the user device based, at least in part, on the mandatory field;

in response to completion of the alternative authentication process by the user, receiving alternative authentication information from the user device, the alternative authentication information comprising at least one authentication parameter; and assigning the at least one authentication parameter to the corresponding mandatory field from the mandatory field based, at least in part, on the alternative authentication information.

18. A non-transitory computer-readable storage medium comprising computer-executable instructions that, when executed by at least a processor of a server system, cause the server system to perform a Fast Identity Online (FIDO) authentication mismatch resolution method comprising:

receiving a mismatch resolution request comprising authentication information from a payment gateway for a FIDO authentication of a user, the mismatch resolution request indicating a FIDO protocol mismatch between a first FIDO service provider and a second FIDO service provider, wherein the first FIDO service provider is associated with at least one application installed on a user device associated with the user and the second FIDO service provider is associated with the payment gateway;

extracting a template associated with the second FIDO service provider from a plurality of templates from a database associated with the server system;

mapping, by a rule-based model associated with the server system, the authentication information on the template, wherein the mapping by the rule-based model comprises:

extracting one or more authentication parameters from the authentication information;

assigning at least one authentication parameter to at least one corresponding field on the template based on predefined mapping rules; and responsive to a mandatory field on the template lacking an assignable authentication parameter, performing a fallback operation comprising determining whether a historically successful authentication has occurred within a predefined time interval and assigning an authentication parameter obtained during the historically successful authentication when the historically successful authentication is determined to have occurred;

transmitting a FIDO authentication request message comprising the template to the second FIDO service provider; and upon receiving a FIDO authentication response message comprising an authentication successful flag from the second FIDO service provider, transmitting an authentication successful message to the payment gateway.

* * * * *